(12) United States Patent
Mori et al.

(10) Patent No.: US 11,063,544 B2
(45) Date of Patent: Jul. 13, 2021

(54) INVERTER DEVICE AND ELECTRIC POWER STEERING APPARATUS

(71) Applicant: Mitsubishi Electric Corporation, Tokyo (JP)

(72) Inventors: Tatsuya Mori, Tokyo (JP); Akira Furukawa, Tokyo (JP); Isao Kezobo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/614,614

(22) PCT Filed: Jul. 4, 2017

(86) PCT No.: PCT/JP2017/024517
§ 371 (c)(1),
(2) Date: Nov. 18, 2019

(87) PCT Pub. No.: WO2019/008676
PCT Pub. Date: Jan. 10, 2019

(65) Prior Publication Data
US 2020/0153375 A1  May 14, 2020

(51) Int. Cl.
*H02P 27/08* (2006.01)
*H02P 1/00* (2006.01)
(Continued)

(52) U.S. Cl.
CPC ............ *H02P 27/08* (2013.01); *B62D 5/0463* (2013.01); *H02M 1/00* (2013.01); *H02M 7/53871* (2013.01); *H02M 2001/0009* (2013.01)

(58) Field of Classification Search
CPC .... H02P 27/08; H02P 21/22; H02M 7/53871; H02M 1/00; B62D 5/0463; B62D 5/046
See application file for complete search history.

(56) References Cited

U.S. PATENT DOCUMENTS 6,433,504 B1    8/2002  Branecky
6,700,343 B2 *  3/2004  Masaki .................... H02P 6/18
                                                   318/434
(Continued)

FOREIGN PATENT DOCUMENTS

CN    103701387 A    4/2014
EP    1 280 266 A2   1/2003
(Continued)

OTHER PUBLICATIONS

Shigeo Morimoto, et al., "Principle and Design Method for Energy-Saving Motor", Kagakujyoho Shuppan Co., Ltd, Jul. 5, 2013, pp. 109-110.

(Continued)

*Primary Examiner* — Thai T Dinh
(74) *Attorney, Agent, or Firm* — Sughrue Mion, PLLC; Richard C. Turner

(57) ABSTRACT

An inverter device includes: an inverter, a power supply current detection sensor, a phase current detection sensor, a three-phase voltage command calculator, and an inverter on/off signal generation unit. The phase current detection sensor detects a phase current in one phase of the inverter. The inverter on/off signal generation unit generates on/off signals based on the phase voltage commands. The three-phase voltage command calculator uses the power supply current and the phase current detected by the power supply current detection sensor and the phase current detection sensor, respectively, so as to calculate phase voltage commands directed to the inverter, and at a center time point of a period in which an upper arm switching element corresponding to one phase out of two phases for which the phase current detection sensor is not provided is on, and lower arm switching elements corresponding to the other two phases are on.

17 Claims, 18 Drawing Sheets

(51) Int. Cl.
*B62D 5/04* (2006.01)
*H02M 1/00* (2006.01)
*H02M 7/5387* (2007.01)

(56) References Cited

U.S. PATENT DOCUMENTS

| | | |
|---|---|---|
| 9,584,043 B2* | 2/2017 | Zhang .................. H02M 7/48 |
| 9,966,893 B2* | 5/2018 | Schock .................. H02P 6/12 |
| 2003/0020430 A1 | 1/2003 | Hiraga et al. |
| 2005/0218864 A1* | 10/2005 | Eguchi .................. H02P 21/22 |
| | | 318/807 |
| 2006/0176059 A1 | 8/2006 | Mir et al. |
| 2008/0191660 A1 | 8/2008 | Krause et al. |
| 2009/0256503 A1 | 10/2009 | Ueda et al. |
| 2011/0221369 A1* | 9/2011 | Welchko ............ H02P 29/0241 |
| | | 318/400.22 |
| 2011/0292700 A1 | 12/2011 | Arakawa et al. |
| 2012/0206075 A1* | 8/2012 | Kimpara ........... H02M 7/53875 |
| | | 318/400.15 |
| 2013/0082636 A1* | 4/2013 | Ohori .................... H03H 17/06 |
| | | 318/723 |
| 2014/0054103 A1* | 2/2014 | Kezobo ................ G01R 31/343 |
| | | 180/446 |
| 2015/0077025 A1* | 3/2015 | Suzuki .................. B62D 5/046 |
| | | 318/400.02 |
| 2015/0365026 A1 | 12/2015 | Schock et al. |
| 2016/0336892 A1* | 11/2016 | Schock ................... H02P 6/12 |

FOREIGN PATENT DOCUMENTS

| | | |
|---|---|---|
| JP | 2003-047261 A | 2/2003 |
| JP | 2008-092800 A | 4/2008 |
| JP | 2009-261066 A | 11/2009 |
| JP | 2010-11540 A | 1/2010 |
| JP | 4539237 B2 | 9/2010 |
| JP | 5216136 B2 | 6/2013 |
| JP | 2014-099997 A | 5/2014 |
| JP | 2017-038443 A | 2/2017 |
| WO | 2010/103733 A1 | 9/2010 |

OTHER PUBLICATIONS

International Search Report for PCT/JP2017/024517 dated Oct. 3, 2017 [PCT/ISA/210].
Written Opinion for PCT/JP2017/024517 dated Oct. 3, 2017 [PCT/ISA/210].
Communication dated Jun. 9, 2020 from European Patent Office in EP Application No. 17916826.5.
Communication dated May 14, 2021 in European Application No. 17916826.5.

* cited by examiner

FIG. 4

| Sup | Sun | Svp | Svn | Swp | Swn | VOLTAGE VECTOR | Idc_s |
|---|---|---|---|---|---|---|---|
| 0 | 1 | 0 | 1 | 0 | 1 | V0 | 0 |
| 1 | 0 | 0 | 1 | 0 | 1 | V1 | Iu |
| 1 | 0 | 1 | 0 | 0 | 1 | V2 | -Iw |
| 0 | 1 | 1 | 0 | 0 | 1 | V3 | Iv |
| 0 | 1 | 1 | 0 | 1 | 0 | V4 | -Iu |
| 0 | 1 | 0 | 1 | 1 | 0 | V5 | Iw |
| 1 | 0 | 0 | 1 | 1 | 0 | V6 | -Iv |
| 1 | 0 | 1 | 0 | 1 | 0 | V7 | 0 |

INVERTER DEVICE AND ELECTRIC POWER STEERING APPARATUS

CROSS REFERENCE TO RELATED APPLICATIONS

This application is a National Stage of International Application No. PCT/JP2017/024517 filed Jul. 4, 2017.

TECHNICAL FIELD

The present invention relates to an inverter device and an electric power steering apparatus including the inverter device.

BACKGROUND ART

Hitherto, there has been disclosed an inverter device configured to switch a DC voltage of a DC power supply by PWM modulation, to thereby output three-phase AC currents having a sinusoidal waveform. In this inverter device, there are provided a power supply shunt resistor configured to detect a current between the DC power supply and the inverter device and lower arm shunt resistors in two phases each configured to detect a phase current between a lower arm switching element and a negative side of the DC power supply so that the power supply shunt resistor detects a phase current that cannot be detected by the lower arm shunt resistors (for example, see Patent Literature 1).

Moreover, a one-shunt current detection method for an inverter device cannot detect a fundamental wave (an average value of a PWM cycle) of a current containing a ripple caused by the PWM control of an output current of the inverter device.

In order to address this problem, in the current measurement of the one-shut current detection method, there is disclosed a technology of compensating for an offset error based on a first current value detected at a first measurement point in a half cycle B and a second current value detected at a second measurement point in a half cycle A (see Patent Literature 2).

CITATION LIST

Patent Literature

[PTL 1] JP 4539237 B2
[PTL 2] JP 5216136 B2

Non Patent Literature

[NPL 1] Morimoto, Shigeo et al., "Principle and Design Method for Energy-Saving Motor", Kagakujyoho Shuppan Co., Ltd., Jul. 5, 2013, pp. 109-110

SUMMARY OF INVENTION

Technical Problem

In the configuration including the lower arm shunt resistors in two phases in addition to the power supply shunt resistor as described in Patent Literature 1, a total of three shunt resistors, which are one power supply shunt resistor and two lower arm shunt resistors, are required, and thus there is such a problem that a cost of detecting the output current of the inverter device is high.

Moreover, in such a configuration that the first measurement point and the second measurement point are provided as described in Patent Literature 2, there occurs a case in which the currents cannot be acquired at both of the first measurement point and the second measurement point depending on an output voltage of the inverter. For example, in this bus one-shunt current method, "on" time points are set to be different in the respective phases in the half cycle B, and the first measurement point is set in the section. Similarly, "off" time points are set to be different in the respective phases in the half cycle A, and the second measurement point is set in the section. However, when the "on" time points are set to be different in the respective phases of the inverter device in order to set the first measurement point, "off" time points in the respective phases may approximately match one another in the half cycle A depending on the output voltage of the inverter device. In such a case, the current cannot be detected in the half cycle A by the one-shunt current detection method, resulting in such a problem that the offset cannot be corrected and an error occurs in the current detected for the average value in the PWM cycle.

The present invention has been made in view of the above-mentioned problem, and therefore has an object to provide an inverter device a power steering apparatus including the inverter device, which are capable of increasing a current detection accuracy and reducing the cost.

Solution to Problem

According to one embodiment of the present invention, there is provided an inverter device including: a three-phase inverter configured to invert a DC voltage supplied from a DC power supply to AC voltages to output the AC voltages to an AC motor; a power supply current detection sensor configured to detect a power supply current flowing between the DC power supply and the three-phase inverter; a phase current detection sensor, which is provided for one phase out of three phases of the three-phase inverter, and is configured to detect a phase current flowing in the one phase; and a control unit configured to use at least one of the power supply current or the phase current so as to calculate phase voltage commands corresponding to instruction values directed to the AC voltages output by the three-phase inverter, and generate on/off signals to be output to the three-phase inverter based on the phase voltage commands, wherein the three-phase inverter is provided with an upper arm switching element and a lower arm switching element for each of the phases, and wherein when a time point at a center of a period in which the upper arm switching element corresponding to one phase out of the three phases of the three-phase inverter for which the phase current detection sensor is not provided is on, and the lower arm switching elements corresponding to the other two phases are on is set to a center time point, the control unit uses, as the power supply current and the phase current, a power supply current and a phase current detected at the center time point, respectively, by the power supply current detection sensor and the phase current detection sensor.

Advantageous Effects of Invention

With the inverter device according to the present invention, the power supply current detection sensor and the phase current detection sensor are configured to detect the power supply current and the phase current at the center time point, respectively, and the phase currents in the total of two phases can be detected by only the total of two sensors. Moreover, the phase current in the remaining one phase can be estimated from the phase currents in the two phases, and the cost can thus be reduced. Further, the detection is executed at the center time point, and the average values in the respective phase currents can be detected, resulting in an increase in the current detection accuracy.

BRIEF DESCRIPTION OF DRAWINGS

FIG. 4 is a table for showing an example of a data table for defining a relationship between a switching pattern and a phase current that can be reproduced from a power supply current of the inverter device according to the first embodiment of the present invention.

DESCRIPTION OF EMBODIMENTS

First Embodiment

Figure 1:
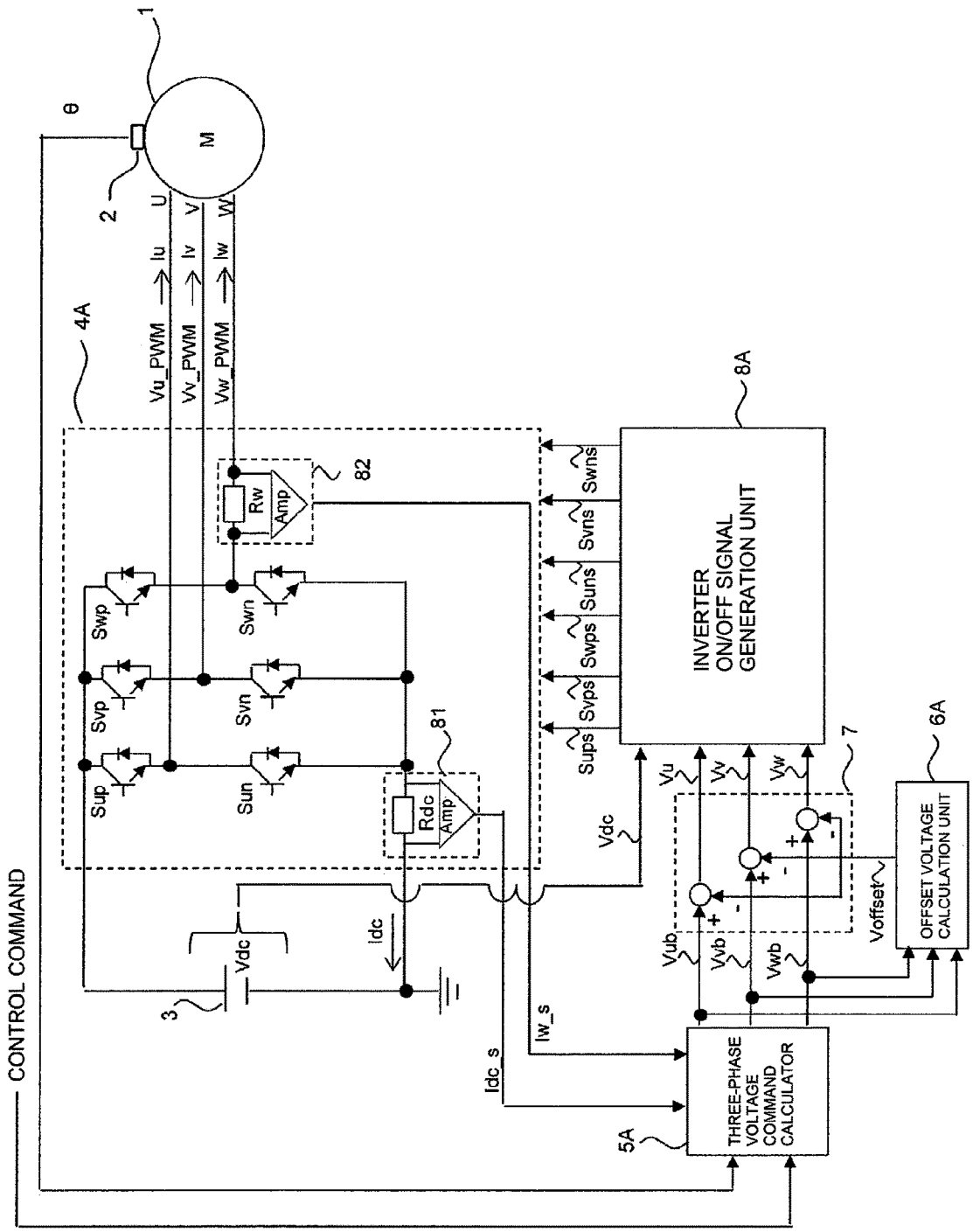
FIG. 1 is a configuration diagram for illustrating a configuration of an inverter device and an electric power steering apparatus according to a first embodiment of the present invention.

FIG. 1 is an overall configuration diagram for illustrating a configuration of an inverter device and an electric power steering apparatus according to a first embodiment of the present invention. The inverter device includes an inverter 4A, a three-phase voltage command calculator 5A, an offset voltage calculation unit 6A, a subtractor 7, and an inverter on/off signal generation unit 8A.

Figure 18:
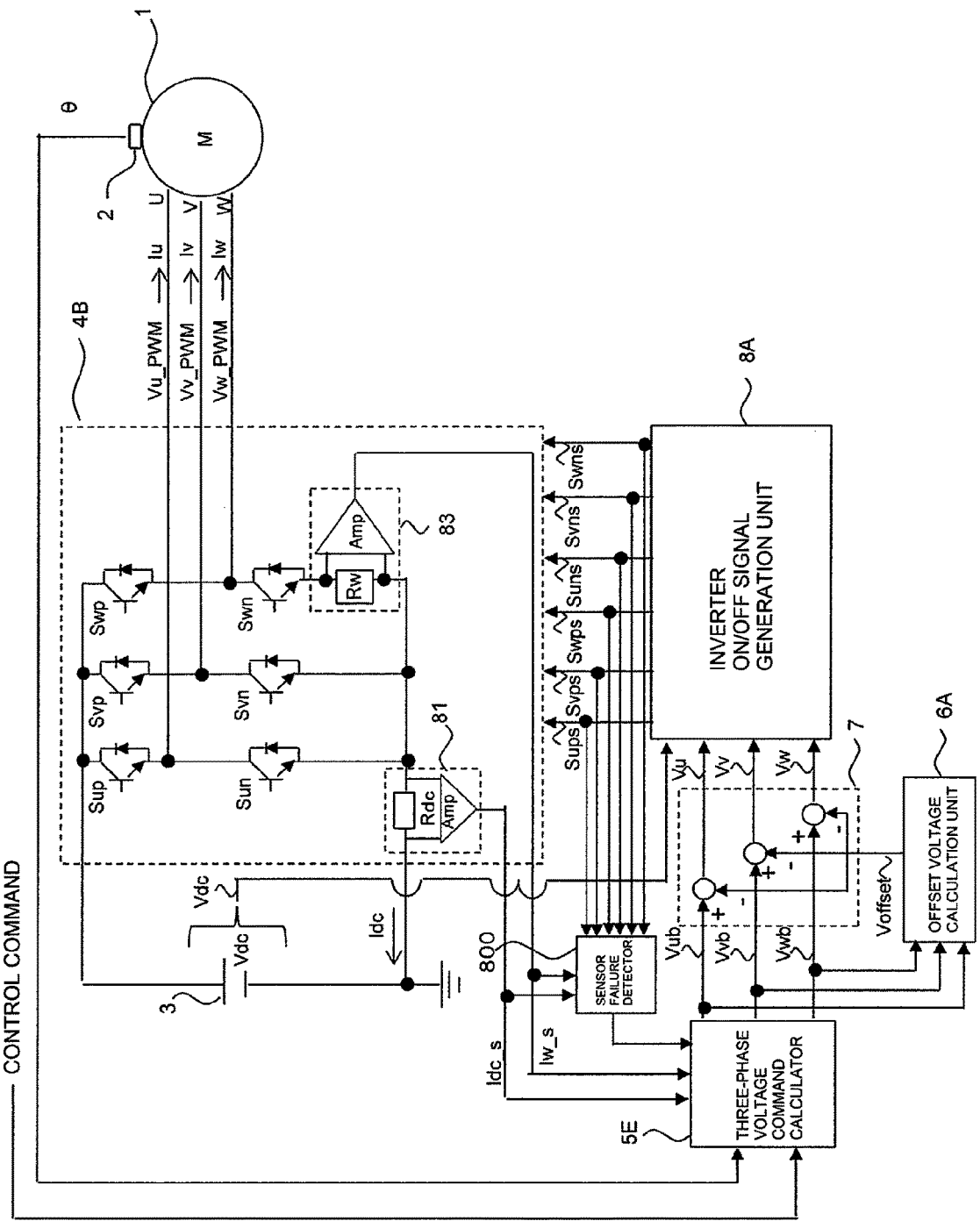
FIG. 18 is a configuration diagram for illustrating the configuration of the inverter device and the electric power steering apparatus according to a ninth embodiment of the present invention.

Moreover, when the inverter device is applied to an electric power steering apparatus, the electric power steering apparatus includes this inverter device and an AC motor 1. In this case, the AC motor 1 is configured to generate an assist torque for assisting steering by a driver. The assist torque generated by the AC motor 1 is transmitted through a gear 904 to a steering shaft 905 coupling a steering wheel 901 and front wheels 902 of a vehicle to each other as illustrated in FIG. 18 as described later, for example.

In FIG. 1, the AC motor 1 is a permanent magnet synchronous motor including three-phase windings U, V, and W in a stator, and permanent magnets in a rotor. Three-phase terminal voltages Vu_PWM, Vv_PWM, and Vw_PWM are applied from the inverter 4A to the AC motor 1, thereby supplying currents Iu, Iv, and Iw to the AC motor 1.

A rotation position detector 2 is configured to detect a rotor magnetic pole position θ of the AC motor 1. The rotor magnetic pole position θ is an electrical angle.

In the following, a magnetic pole direction of the rotor is referred to as "d axis", and an axis having a phase difference in electrical angle of 90 degrees with respect to the d axis is referred to as "q axis".

A DC power supply 3 is configured to output a DC voltage Vdc to the inverter 4A. As a device for forming the DC power supply 3, for example, a battery, a DC-DC converter, a diode rectifier, a PWM rectifier, and the like are given. Moreover, the device is not limited to those devices, and all devices that output a DC voltage can be used as the DC power supply 3.

The inverter 4A includes a plurality of switching elements Sup, Svp, Swp, Sun, Svn, and Swn. In the following, out of those switching elements, the switching elements Sup, Svp, and Swp are referred to as "upper arm switching elements", and the switching elements Sun, Svn, and Swn are referred to as "lower arm switching elements".

The inverter 4A is configured to turn on/off the switching elements Sup to Swn in accordance with on/off signals Sups to Swns output from the inverter on/off signal generation unit 8A to execute power conversion from a DC voltage to AC voltages, and output the three-phase terminal voltages Vu_PWM, Vv_PWM, and Vw_PWM to the three-phase windings U, V, and W of the AC motor 1.

Each of the switching elements Sup to Swn includes a semiconductor switch such as an IGBT, a bipolar transistor, a MOS power transistor, or the like and a diode inversely connected in parallel with the semiconductor switch.

Moreover, the inverter 4A further includes a power supply current detection sensor 81 and a phase current detection sensor 82. The power supply current detection sensor 81 includes a resistor Rdc provided on a power supply line and a first amplifier Amp. The power supply current detection sensor 81 is configured to amplify a voltage between both ends of the resistor Rdc through use of the first amplifier Amp, to thereby acquire a power supply current Idc_s, and output the power supply current Idc_s to the three-phase voltage command calculator 5A. Moreover, the phase current detection sensor 82 includes a resistor Rw and a second amplifier Amp provided in the W phase. The phase current detection sensor 82 is configured to amplify a voltage between both ends of the resistor Rw through use of the second amplifier, to thereby acquire a phase current Iw_s, and output the phase current Iw_s to the three-phase voltage command calculator 5A.

The three-phase voltage command calculator 5A is configured to calculate fundamental three-phase voltage commands Vub, Vvb, and Vwb for controlling the AC motor 1 in a desired state based on a control command directed to the motor 1 input from the outside, the rotor magnetic pole position θ output from the rotation position detector 2, and the power supply current Idc_s and the phase current Iw_s output from the inverter 4A.

The offset voltage calculation unit 6A is configured to output an offset voltage Voffset based on the fundamental three-phase voltage commands Vub, Vvb, and Vwb. A purpose of the calculation of the offset voltage Voffset is to increase a voltage utilization rate of the inverter 4A. It is only required to use a publicly-known technology for the calculation of the offset voltage Voffset. For example, a third higher harmonic signal described in "Principle and Design Method for Energy-Saving Motor", which is Non-Patent Literature 1, may be used as the offset voltage Voffset. Moreover, the offset voltage Voffset may be obtained through use of the two-phase modulation system or the like.

The subtraction unit 7 is configured to subtract the offset voltage Voffset calculated by the offset voltage calculation unit 6A from the fundamental three-phase voltage command Vub, Vvb, and Vwb output from the three-phase voltage command calculator 5A, to thereby calculate the three-phase voltage commands Vu, Vv, and Vw.

The inverter on/off signal generation unit 8A is configured to output the on/off signals Sups to Swns for the switching elements Sup to Swn of the inverter 4A based on the three-phase voltage command Vu, Vv, and Vw output from the subtractor 7 and the DC voltage Vdc output from the DC power supply 3.

The three-phase voltage command calculator 5A, the offset voltage calculation unit 6A, the subtraction unit 7, and the inverter on/off signal generation unit 8A form a control unit configured to calculate the voltage commands Vu, Vv, and Vw corresponding to command values of the AC voltages output by the inverter 4A, generate the on/off signals Sups to Swns based on the voltage commands Vu, Vv, and Vw, and output the on/off signals Sups to Swns to the inverter 4A.

A detailed description is now given of operations of the inverter on/off signal generation unit 8A and the inverter 4A. In the inverter on/off signal generation unit 8A, Expression (1), Expression (2), and Expression (3) are first used to convert the three-phase voltage commands Vu, Vv, and Vw to on-duty commands Du, Dv, and Dw, respectively.

$$Du = Vu/Vdc + 0.5 \quad (1)$$

$$Dv = Vv/Vdc + 0.5 \quad (2)$$

$$Dw = Vw/Vdc + 0.5 \quad (3)$$

Figure 2:
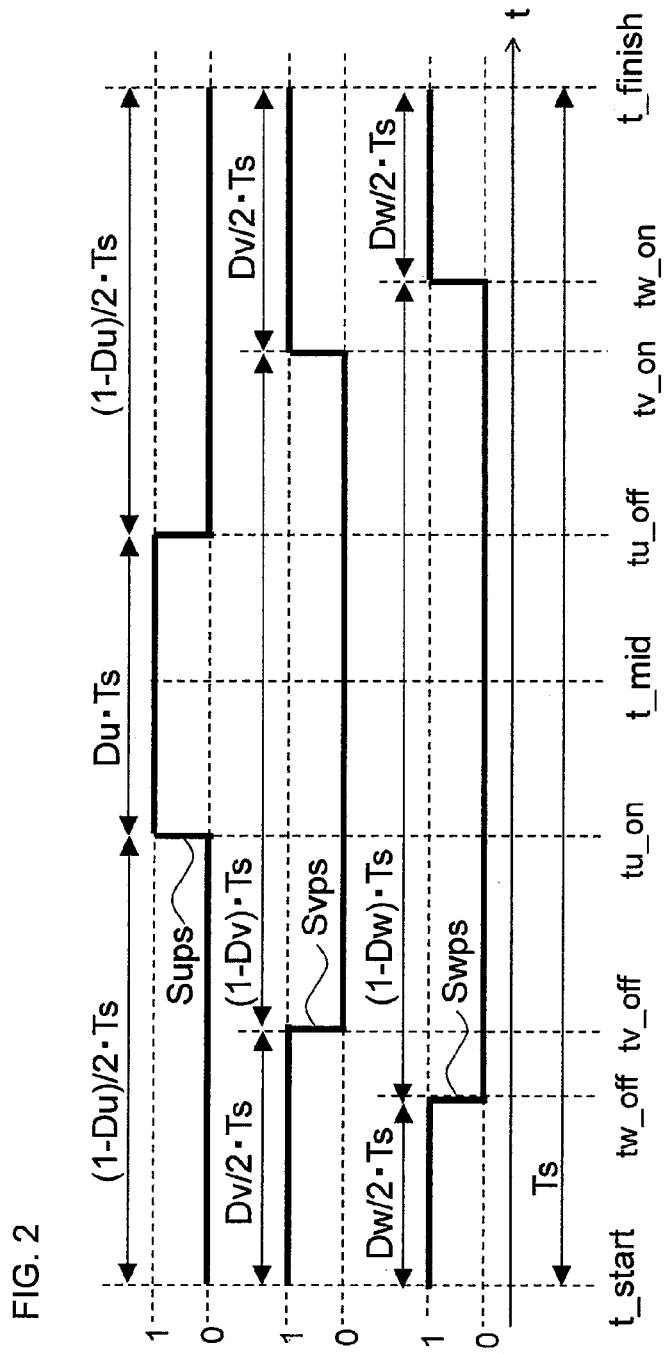
FIG. 2 is a timing chart for illustrating relationships between on-duty commands and on/off signals for upper arm switching elements in the inverter device according to the first embodiment of the present invention.

FIG. 2 is a chart for illustrating relationships between the on-duty commands Du, Dv, and Dw and the on/off signals Sups, Svps, and Swps for the upper arm switching elements Sup, Svp and Swp of the inverter 4A in a switching cycle Ts of the inverter 4A. It is assumed that the switching cycle Ts is, for example, 50 μs in this state.

In FIG. 2, a start time point of the switching cycle Ts is a time point t_start, and an end time point of the switching cycle Ts is a time point t_finish.

First, a description is given of the on/off signal Sups. As illustrated in the example of FIG. 2, the value of the on/off signal Sups is 0 between the time point t_start and a time point tu_on, that is, an "off" command is issued. Moreover, the value of the on/off signal Sups is 1 between the time point tu_on and a time point tu_off, that is, an "on" command is issued. Further, the value of the on/off signal Sups is 0 between the time point tu_off and the time point t_finish, that is, the "off" command is issued. In this configuration, a period from the time point tu_on to the time point tu_off is set to "Du×Ts". As a result, a ratio of the "on" command, which turns on the switching element Sup, to the switching cycle Ts matches the on-duty command Du corresponding to the U phase.

Then, a description is given of the on/off signal Svps. As illustrated in the example of FIG. 2, the value of the on/off signal Svps is 1 between the time point t_start and a time point tv_off, that is, an "on" command is issued. Moreover, the value of the on/off signal Svps is 0 between the time point tv_off and a time point tv_on, that is, an "off" command is issued. Further, the value of the on/off signal Svps is 1 between the time point tw_on and the time point t_finish, that is, the "on" command is issued. In this configuration, a period from the time point tv_off to the time point tv_on is set to "(1−Dv)×Ts". As a result, a ratio of the "on" command, which turns on the switching element Svp, to the switching cycle Ts matches the on-duty command Dv corresponding to the V phase.

Then, a description is given of the on/off signal Swps. As illustrated in the example of FIG. 2, the value of the on/off signal Swps is 1 between the time point t_start and a time point tw_ff, that is, an "on" command is issued. Moreover, the value of the on/off signal Swps is 0 between the time point tw_off and a time point tw_on, that is, an "off" command is issued. Further, the value of the on/off signal Swps is 1 between the time point tw_on and the time point t_finish, that is, the "on" command is issued. In this configuration, a period from the time point tw_off to the time point tw_on is set to "(1−Dw)×Ts". As a result, a ratio of the "on" command, which turns on the switching element Swp, to the switching cycle Ts matches the on-duty command Dw corresponding to the W phase.

Figure 3:
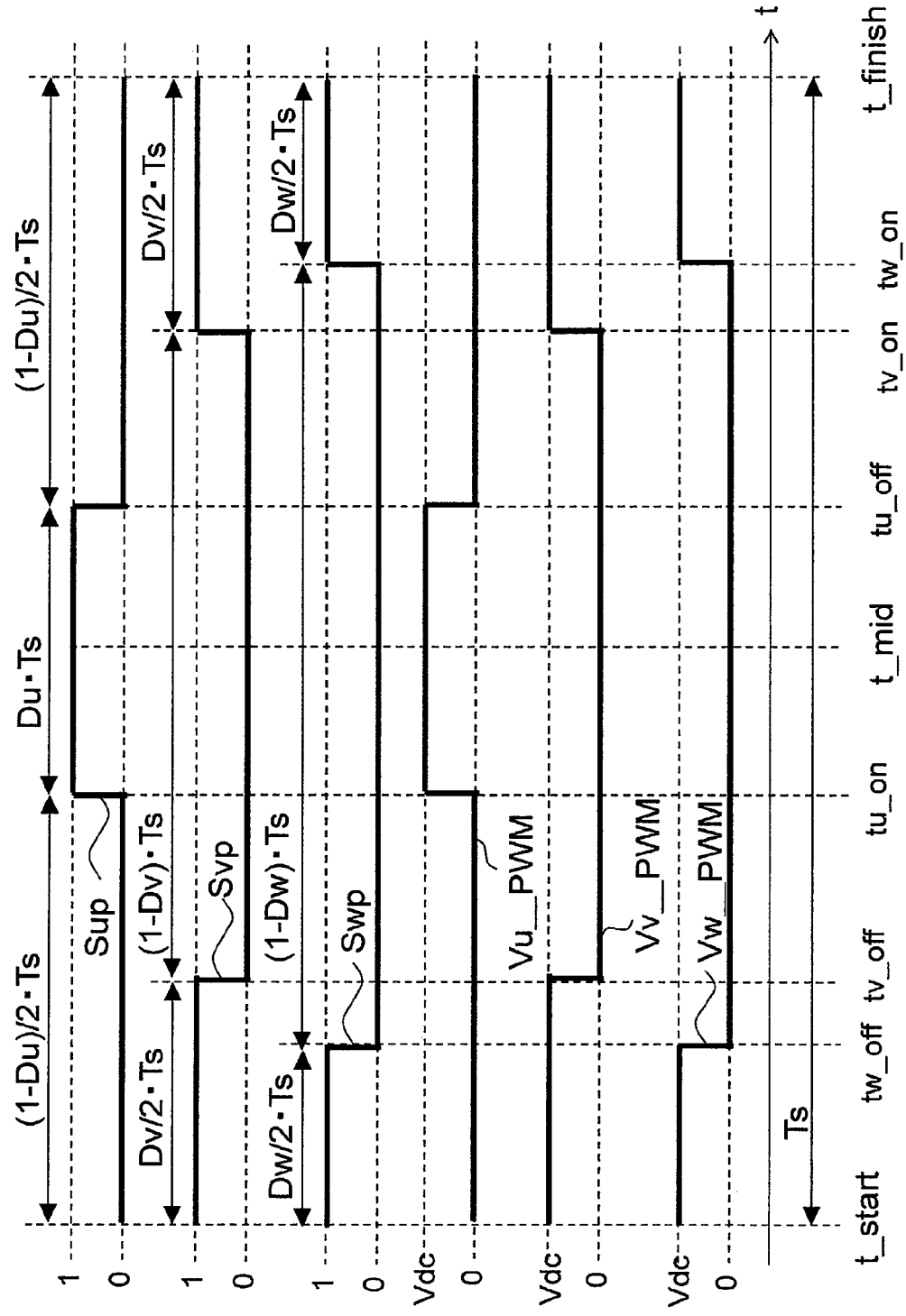
FIG. 3 is a timing chart for illustrating relationships between on/off states of the upper arm switching elements and three-phase terminal voltages output from an inverter in the inverter device according to the first embodiment of the present invention.

FIG. 3 is a chart for illustrating relationships between the on/off states of the upper arm switching elements Sup, Svp, and Swp of the inverter 4A and the three-phase terminal voltages Vu_PWM, Vv_PWM, and Vw_PWM output from the inverter 4A in the switching cycle Ts of the inverter 4A. Signals for the lower arm switching elements Sun, Svn, and Swn of the inverter 4A are inverted signals of those for the upper arm switching elements Sup, Svp, and Swp, respectively, and are not illustrated. In FIG. 3, as in FIG. 2, the switching cycle Ts is, for example, 50 μs. In Sup to Swn of FIG. 3, 1 means "on", and 0 means "off".

In FIG. 3, the on/off signal Sups is synchronized with "on/off" of the switching element Sup in the U phase. That is, when Sups=1, then Sup=1, and when Sups=0, then Sup=0. Further, "on/off" of the switching element Sup is synchronized with the three-phase terminal voltage Vu_PWM. That is, when Sup=1, then Vu_PWM=Vdc, and when Sup=0, then Vu_PWM=0.

Further, the on/off signal Svps is synchronized with "on/off" of the switching element Svp in the V phase. That is, when Svps=1, then Svp=1, and when Svps=0, then Svp=0. Further, "on/off" of the switching element Svp is synchronized with the three-phase terminal voltage Vv_PWM. That is, when Sup=1, then Vv_PWM=Vdc, and when Sup=0, then Vv_PWM=0.

Further, the on/off signal Swps is synchronized with "on/off" of the switching element Swp in the W phase. That is, when Swps=1, then Swp=1, and when Swps=0, then Swp=0. Further, "on/off" of the switching element Swp is synchronized with the three-phase terminal voltage Vw_PWM. That is, when Svp=1, then Vw_PWM=Vdc, and when Svp=0, then Vw_PWM=0.

Moreover, both of a detection time point of the power supply current Idc_s by the power supply current detection sensor 81 and a detection time point of the phase current Iw_s by the phase current detection sensor 82 are set to a center time point t_mid illustrated in FIG. 2 and FIG. 3.

The center time point t_mid is a center time point between the start time point t_start and the end time point t_finish of the switching cycle Ts, and is also a center time point between the time point tu_on and the time point tu_off.

As illustrated in FIG. 2 and FIG. 3, the center time point t_mid is a center time point in a period in which the upper arm switching element Sup in the U phase for which the phase current detection sensor 82 is not provided is on and the upper arm switching elements Svp and Swp in the other two phases (the V phase and the W phase) are off, namely, the period from the time point tu_on to the time point tu_off. Thus, the detection at the center time point t_mid is detection of the power supply current Idc_s and the phase current Iw_s at the center time point of that period.

FIG. 4 is a table for showing a relationship between a switching pattern of the switching elements Sup to Swn of the inverter 4A and a phase current that can be reproduced from the power supply current Idc_s. The table of FIG. 4 is stored in advance in the three-phase voltage command calculator 5A. As appreciated from FIG. 3, a switching pattern at the time point t_mid is such a pattern that Sup=1, Svp=0, and Swp=0. Thus, a power supply current Idc_s corresponding to this switching pattern is the power supply current Idc_s detected at the time point t_mid, and it is appreciated from FIG. 4 that the value of the power supply current Idc_s is equal to the current Iu flowing in the U phase.

From the description given above, a U-phase current Iu_s can be detected by using the power supply current detection sensor 81 to detect the power supply current Idc_s at the center time point t_mid. Moreover, a W-phase current Iw_s is detected by the phase current detection sensor 82.

In this state, the three-phase voltage command calculator 5A reproduces a V-phase current Iv_s given by Expression (4) based on the power supply current Idc_s (=Iu_s) detected at the center time point t_mid and the phase current Iw_s detected by the phase current detection sensor 82.

$$Iv\_s = -Iu\_s - Iw\_s \tag{4}$$

Then, the three-phase voltage command calculator 5A uses the phase currents Iu_s, Iv_s, and Iw_s and the rotor magnetic pole position θ so as to obtain motor currents id and iq on rotating two axes (d-q) by Expression (5).

$$\begin{pmatrix} i_d \\ i_q \end{pmatrix} = \frac{\sqrt{2}}{\sqrt{3}} \begin{bmatrix} \cos(\theta) & \cos\left(\theta - \frac{2\pi}{3}\right) & \cos\left(\theta + \frac{2\pi}{3}\right) \\ -\sin(\theta) & -\sin\left(\theta - \frac{2\pi}{3}\right) & -\sin\left(\theta + \frac{2\pi}{3}\right) \end{bmatrix} \begin{bmatrix} I_{u\_s} \\ I_{v\_s} \\ I_{w\_s} \end{bmatrix} \tag{5}$$

Then, when the control command is set to current commands on the rotating two axes, for example, id_target and iq_target, the three-phase voltage command calculator 5A calculates a voltage command Vd relating to the d axis from Expression (6) based on the current command id_target relating to the d axis and the motor current id given by Expression (5).

$$V_d = k_d \left(1 + \frac{1}{T_d s}\right)(i_{d\_target} - id) \tag{6}$$

In Expression (6), kd and Td are a proportional gain and an integration time constant, respectively, and are only required to be determined based on a desired response of id for id_target.

Then, the three-phase voltage command calculator 5A calculates a voltage command Vq relating to the q axis from Expression (7) based on the current command iq_target relating to the q axis and the motor current iq given by Expression (5).

$$V_q = k_q \left(1 + \frac{1}{T_q s}\right)(i_{q\_target} - iq) \tag{7}$$

In Expression (7), kq and Tq are a proportional gain and an integration time constant, respectively, and are only required to be determined based on a desired response of iq for iq_target.

Then, the three-phase voltage command calculator 5A uses the voltage command Vd relating to the d axis given by Expression (6), the voltage command Vq relating to the q axis given by Expression (7), and the rotor magnetic pole position θ detected by the rotation position detector 2 so as to calculate the fundamental three-phase voltage commands Vub, Vvb, and Vwb by Expression (8).

$$\begin{pmatrix} v_{ub} \\ v_{vb} \\ v_{wb} \end{pmatrix} = \frac{\sqrt{2}}{\sqrt{3}} \begin{bmatrix} \cos(\theta) & -\sin(\theta) \\ \cos\left(\theta - \frac{2\pi}{3}\right) & -\sin\left(\theta - \frac{2\pi}{3}\right) \\ \cos\left(\theta + \frac{2\pi}{3}\right) & -\sin\left(\theta + \frac{2\pi}{3}\right) \end{bmatrix} \begin{bmatrix} v_d \\ v_q \end{bmatrix} \quad (8)$$

A description is now given of effects of the first embodiment. The center time point t_mid, which is the current detection time point, is the middle time point between the start time point t_start and the end time point t_finish of the switching cycle Ts. Thus, in FIG. 3, the three-phase PWM waveforms (Vu_PWM, Vv_PWM, and Vw_PWM) each have a waveform symmetrical about the center time point t_mid. Thus, the current values detected at the center time point t_mid, namely, Iu_s and Iw_s are average values of the current values Iu and Iw fluctuating in the switching cycle Ts in the first embodiment. The average values of the current values Iu and Iw are fundamental waves of Iu and Iw, and Iu_s and Iw_s detected at the center time point t_mid are thus fundamental wave components of Iu and Iw, respectively. The control for the currents is executed based on the fundamental wave components in the three-phase voltage command calculator 5A, and there is provided such an effect that vibration in the speed, the position, or the torque occurring in the AC motor 1 can be reduced.

When an interval between the time point tu_on and the center time point t_mid is narrow, influence of pulsation on Iw_s and Idc_s by turning on in the U phase remains at the center time point t_mid. Therefore, detection accuracies of Iw_s and Idc_s are low. In this case, the current detection time point is only required to be shifted backward by a from the center time point t_mid. Moreover, the same applies to a case in which an interval between the time point tv_off and the center time point t_mid is narrow and a case in which an interval between the time point tw_off and the center time point t_mid is narrow. That is, when the time point at which the switching element turns off or turns on and the center time point t_mid are close to each other, the current values are detected in a vicinity of the center time point t_mid shifted from the center time point t_mid, and those current values are used to execute the control for the currents. As a result, there can be provided an effect of reducing the influence of the pulsation occurring in the current detection values caused by turning off or turning on of the switching element.

When Patent Literature 1 and the first embodiment of the present invention are compared with each other, both are the same in such a point that the control based on the fundamental wave components of the currents can be executed, but three current sensors are required in Patent Literature 1 while only two current sensors are required in the first embodiment. Therefore, the first embodiment is advantageous in cost over Patent Literature 1.

Moreover, when Patent Literature 2 and the first embodiment are compared with each other, correction of an offset error is difficult depending on the voltage output by the inverter in Patent Literature 2 whereas, in the first embodiment, the fundamental wave components of the currents are always detected, and the current control can be executed based thereon. Therefore, the first embodiment is advantageous over Patent Literature 2 in terms of a control accuracy of the AC motor 1.

As described above, according to the first embodiment, the phase current flowing in the V phase or the U phase for which the phase current detection sensor 82 of the inverter 4A is not provided is detected by the power supply current detection sensor 81, the phase current flowing in the W phase can be detected by the phase current detection sensor 82, and thus the phase currents in the total of two phases can be detected from the power supply current detection sensor 81 and the phase current detection sensor 82. Further, the current in the other one phase can be detected through use of such a fact that the sum of the currents in the three phases flowing through the AC motor 1 is zero. Thus, the three phase currents flowing through the three-phase motor can be detected by the one power supply current detection sensor and the one phase current detection sensor, and there is provided such an effect that the cost relating to the detection of the output currents of the inverter is reduced compared with Patent Literature 1.

Further, the detection time points of the power supply current detection sensor 81 and the phase current detection sensor 82 are set to the center time point t_mid of the period in which the upper arm switching element in the V phase or the U phase for which the phase current detection sensor 82 of the inverter 4A is not provided is on, and the lower arm switching elements in the other two phases are on. As a result, the average values of the respective phase currents in the PWM cycle can be detected, and there can be provided such an effect that the current detection accuracy is increased compared with Patent Literature 2.

Second Embodiment

In a second embodiment of the present invention, a description is omitted for parts overlapping with those of the first embodiment. The second embodiment is different from the first embodiment in an inverter on/off signal generation unit 8B. That is, a configuration of the inverter device and the electric power steering apparatus according to the second embodiment is such a configuration that the inverter on/off signal generation unit 8B is provided in place of the inverter on/off signal generation unit 8A in the configuration of FIG. 1. Therefore, in the second embodiment, a description is given with reference to FIG. 1, and illustration thereof is omitted.

Figure 5:
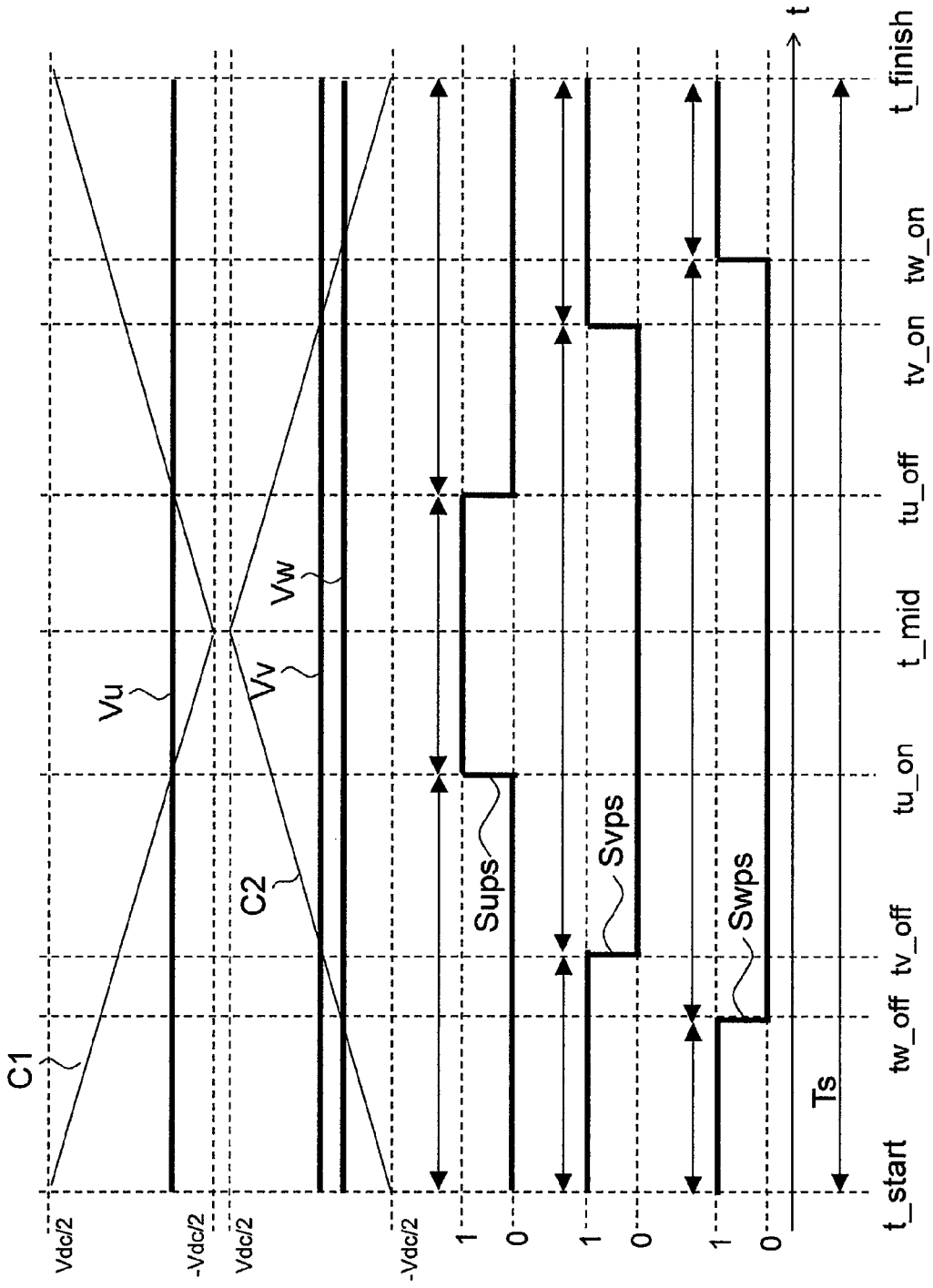
FIG. 5 is an operation explanatory diagram for illustrating an operation of an inverter on/off signal generation unit in the inverter device according to a second embodiment of the present invention.

FIG. 5 is a timing chart for illustrating an operation of the inverter on/off signal generation unit 8B in the second embodiment. In the second embodiment, the on/off signals Sups to Swns are generated by comparing the three-phase voltage commands Vu, Vv, and Vw with carrier triangle waves having the cycle Ts in the inverter on/off signal generation unit 8B.

In FIG. 5, a carrier triangle wave C1 is a carrier triangle wave that reaches the maximum value at the start time point t_start and the end time point t_finish of the switching cycle Ts, and reaches the minimum value at the center time point t_mid. Meanwhile, a carrier triangle wave C2 is a carrier triangle wave that reaches the minimum value at the start time point t_start and the end time point t_finish of the switching cycle Ts, and reaches the maximum value at the center time point t_mid. Thus, the phase of the carrier triangle wave C1 is shifted by 180 degrees with respect to the phase of the carrier triangle wave C2 when the switching cycle Ts is set to 360 degrees.

First, the phase voltage commands Vv and Vw are compared with the carrier triangle wave C2 in the inverter on/off signal generation unit 8B. When the phase voltage command Vv is larger than the carrier triangle wave C2, the on/off signal Svps is set to 1 (ON). When the phase voltage command Vv is smaller than the carrier triangle wave C2, the on/off signal Svps is set to 0 (OFF). Similarly, when the phase voltage command Vw is larger than the carrier triangle wave C2, the on/off signal Swps is set to 1 (ON). When the phase voltage command Vw is smaller than the carrier triangle wave C2, the on/off signal Swps is set to 0 (OFF).

Meanwhile, the phase voltage commands Vu are compared with the carrier triangle wave C1. When the phase voltage command Vu is larger than the carrier triangle wave C1, the on/off signal Sups is set to 1 (ON). When the phase voltage command Vu is smaller than the carrier triangle wave C1, the on/off signal Sups is set to 0 (OFF).

Thus, in this processing, the phase of the carrier triangle wave C1 for the U phase for which the phase current detection sensor 82 is not provided is shifted by 180 degrees with respect to the phase of the carrier triangle wave C2 for the V phase and the W phase for which the phase current detection sensor 82 is provided. Thus, also in this processing, similarly to the first embodiment, each of the three-phase terminal voltages Vu_PWM, Vv_PWM, and Vw_PWM has a waveform symmetrical about the center time point t_mid (the maximum value of the carrier triangle wave C2 or the minimum value of the carrier triangle wave C1, in other words, the peaks of the carrier triangle waves C1 and C2). Thus, the current values (Iu_s and Iw_s) detected at the center time point t_mid are the average values of the current values Iu and Iw fluctuating in the switching cycle Ts. With the above-mentioned configuration, the same effects as in the first embodiment are also provided in the second embodiment.

Third Embodiment

Figure 6:
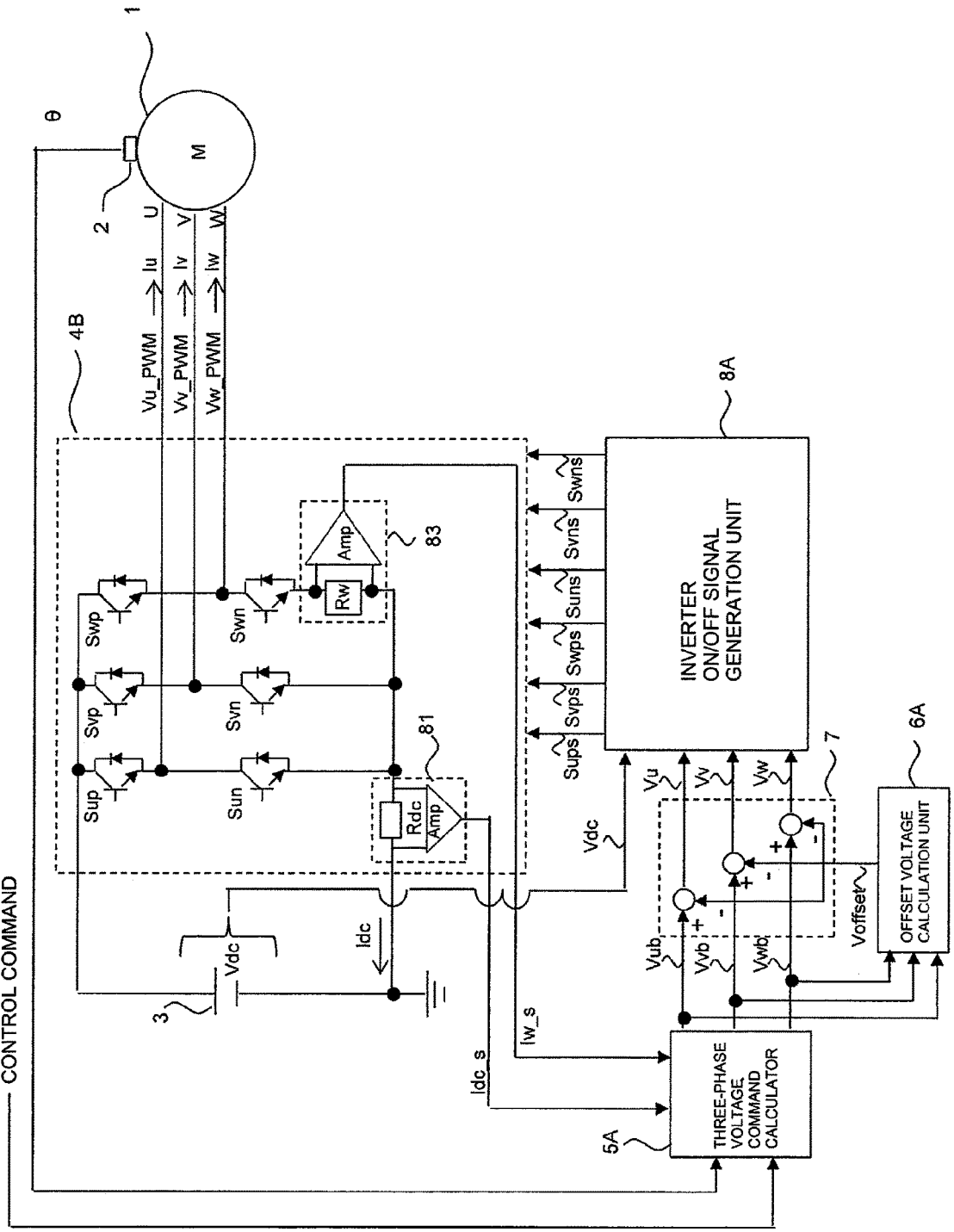
FIG. 6 is a configuration diagram for illustrating the configuration of the inverter device and the electric power steering apparatus according to a third embodiment of the present invention.

FIG. 6 is a configuration diagram for illustrating a configuration of the inverter device and the electric power steering apparatus according to a third embodiment of the present invention. In the third embodiment, a description is omitted for parts overlapping with those of the first embodiment and the second embodiment.

A difference between the third embodiment and the first embodiment is that a phase current detection sensor 83 is provided in an inverter 4B in place of the phase current detection sensor 82 provided in the inverter 4A of FIG. 1.

The phase current detection sensor 83 is provided between the lower arm switching element Swn and a negative terminal of the DC power supply 3. The phase current detection sensor 83 includes a resistor Rw provided between the lower arm switching element Swn and the negative terminal of the DC power supply 3 and a third amplifier Amp. The phase current detection sensor 83 uses the fact that a current flowing through the resistor Rw matches Iw when the lower arm switching element Swn is on so as to detect the W-phase current. That is, the phase current detection sensor 83 outputs the phase current Iw_s acquired by using the third amplifier Amp so as to amplify a voltage between both ends of the resistor Rw at a timing at which the lower arm switching element Swn is on.

In the third embodiment, the detection timing is not changed by replacement of the phase current detection sensor 82 in the first embodiment and second embodiment with the phase current detection sensor 83. For example, referring to FIG. 3, the upper arm switching element Swp in the w phase is off at the center time point t_mid, which is the current detection time point in the first embodiment. Thus, the lower arm switching element Swn is on, and the phase current detection sensor 83 is only required to execute detection and output to the three-phase voltage command calculator 5A at the center time point t_mid similarly to the phase current detection sensor 82.

In this manner, in the third embodiment, the phase current detection sensor 83 provided between the lower arm switching element Swn and the negative terminal of the DC power supply 3 is used in place of the phase current detection sensor 82 provided in the W phase. An electric potential fluctuation of the voltage between the both ends of the resistor Rw of the phase current detection sensor 82 is smaller than an electric potential fluctuation of the voltage between the both ends of the resistor Rw of the phase current detection sensor 83. Thus, in the third embodiment, the electric potential fluctuation of the voltage between the both ends of the resistor Rw can be suppressed. Therefore, a low-class and inexpensive operational amplifier can be used as the third amplifier Amp used for the phase current detection sensor 83, and there can be provided such an effect that the device cost of the inverter device can further be suppressed.

Fourth Embodiment

Figure 7:
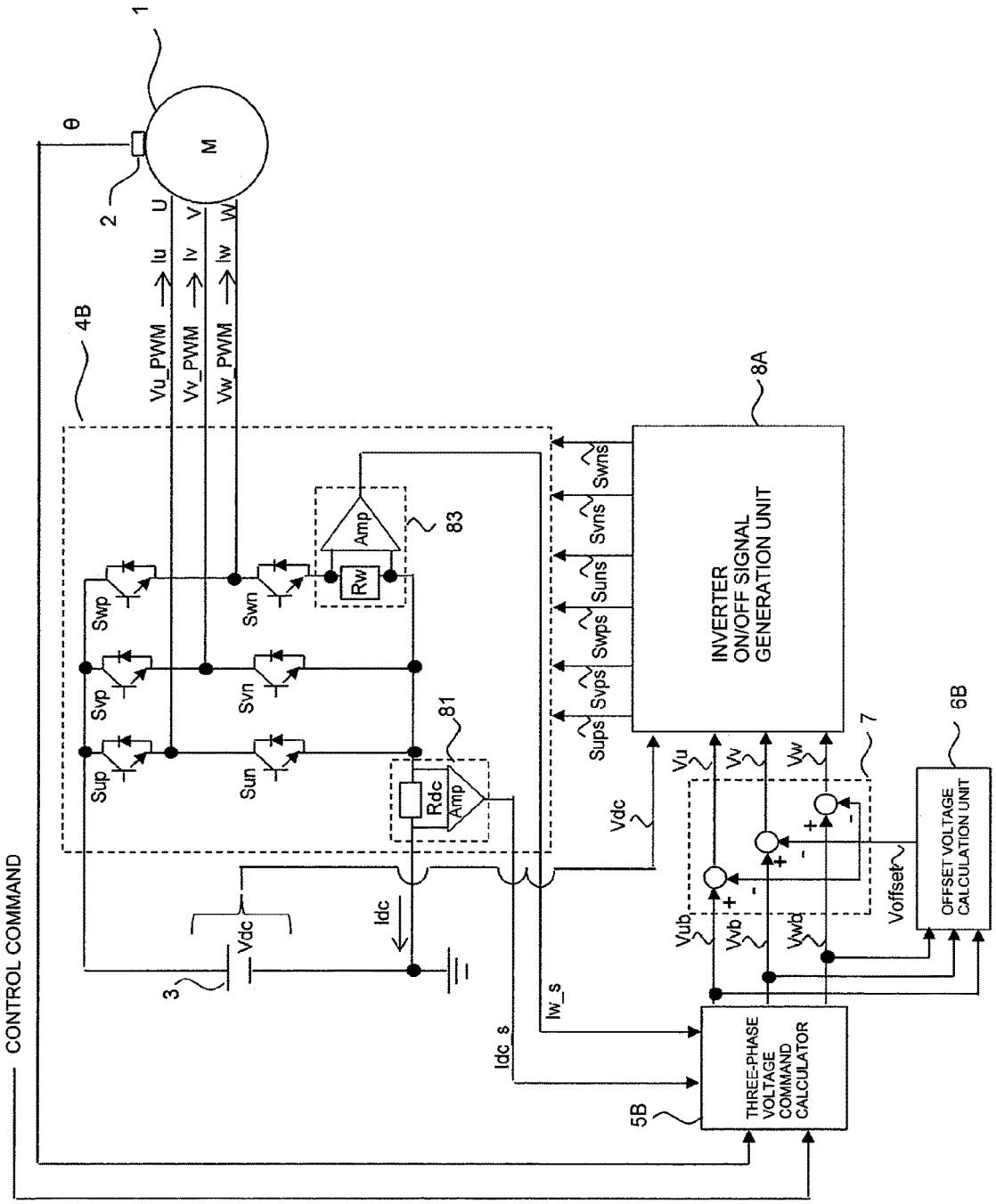
FIG. 7 is a configuration diagram for illustrating the configuration of the inverter device and the electric power steering apparatus according to a fourth embodiment of the present invention.

FIG. 7 is a configuration diagram for illustrating a configuration of the inverter device and the electric power steering apparatus according to a fourth embodiment of the present invention. In the fourth embodiment, a description is omitted for parts overlapping with those of the first to third embodiments. A difference between the fourth embodiment and the third embodiment is that an offset voltage calculation unit 6B and a three-phase voltage command calculator 5B are provided in FIG. 7 in place of the offset voltage calculation unit 6A and the three-phase voltage command calculator 5A of FIG. 6.

Figure 8:
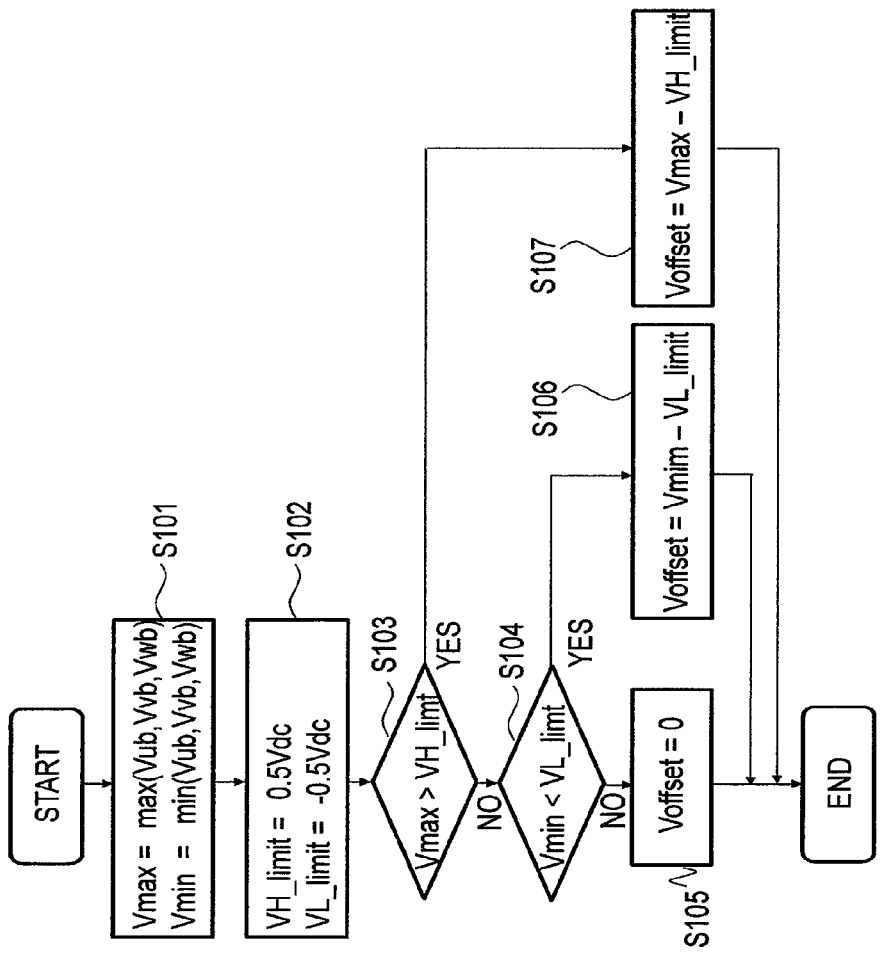
FIG. 8 is a flowchart for illustrating a flow of calculation processing in an offset voltage calculation unit in the inverter device according to the fourth embodiment of the present invention.

FIG. 8 is a flowchart for illustrating a flow of calculation processing in the offset voltage calculation unit 6B.

In FIG. 8, in Step S101, first, the fundamental three-phase voltage commands Vub, Vvb, and Vwb input from the three-phase voltage command calculator 5B are assigned to a maximum phase Vmax, a middle phase Vmid, and a minimum phase Vmin in descending order, respectively, and the maximum phase Vmax and the minimum phase Vmin out of those phases are stored.

Then, in Step S102, 0.5 Vdc is stored in an output upper limit value VH_limit of the inverter 4B, and −0.5 Vdc is stored in an output lower limit value VL_limit of the inverter 4B. The output upper limit value VH_limit is not limited to 0.5 Vdc, and may be another value. Similarly, the output lower limit value VL_limit is not limited to −0.5 Vdc, and may be another value.

In Step S103, it is determined whether or not the maximum phase Vmax exceeds the output upper limit value VH_limit of the inverter 4B. When the maximum phase Vmax exceeds the output upper limit value VH_limit (YES) as a result of the determination, the processing proceeds to processing in Step S107. Meanwhile, when the maximum phase Vmax does not exceed the output upper limit value VH_limit (NO), the processing proceeds to processing in Step S104.

In Step S104, it is determined whether or not the minimum phase Vmin falls below the output lower limit value VL_limit of the inverter 4B. When the minimum phase Vmin falls below the output lower limit value VL_limit (YES) as a result of the determination, the processing proceeds to processing in Step S106. Meanwhile, when the minimum phase Vmin does not fall below the output lower limit value VL_limit (NO), the processing proceeds to processing in Step S105.

In Step S105, 0 is set to the offset voltage Voffset.

In Step S106, a subtraction value obtained by subtracting the output lower limit value VL_limit from the minimum phase Vmin is set to the offset voltage Voffset.

In Step S107, a subtraction value obtained by subtracting the output upper limit value VH_limit from the maximum phase Vmax is set to the offset voltage Voffset.

The offset voltage calculation unit 6B outputs the offset voltage Voffset obtained in this manner to the subtraction unit 7.

Figure 9A:
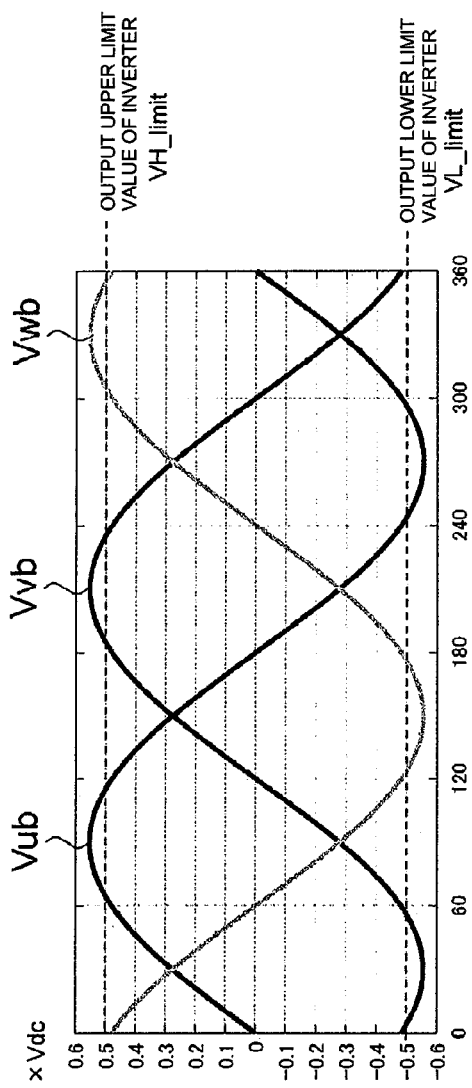
FIGS. 9A and 9B are diagrams for illustrating waveforms of fundamental three-phase voltage commands input to a subtraction unit and voltage commands output from the subtraction unit in one cycle of the electrical angle in the inverter device according to the fourth embodiment of the present invention.
Figure 9B:
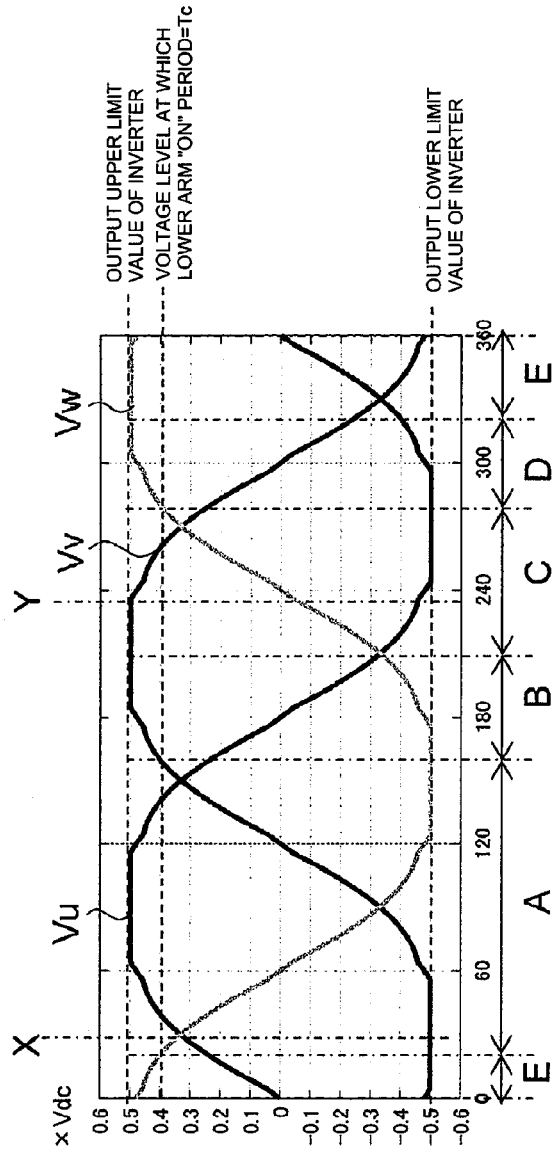

Next, referring to FIG. 9, a description is now given of the operation of the subtraction unit 7. The subtraction unit 7 receives input of the fundamental three-phase voltage commands Vub, Vvb, and Vwb from the three-phase voltage command calculator 5B, and receives input of the offset voltage Voffset from the offset voltage calculation unit 6B. The subtraction unit 7 subtracts the offset voltage Voffset from the fundamental three-phase voltage commands Vub, Vvb, and Vwb, to thereby obtain the voltage commands Vu, Vv, and Vw. FIG. 9 are diagrams for illustrating respective waveforms of fundamental three-phase voltage commands Vub, Vvb, and Vwb input to the subtraction unit 7 and the voltage commands Vu, Vv, and Vw output from the subtraction unit 7 in the one cycle of the electrical angle. FIG. 9A is a diagram for illustrating the fundamental three-phase voltage commands Vub, Vvb, and Vwb. FIG. 9B is a diagram for illustrating the voltage commands Vu, Vv, and Vw.

In this state, as illustrated in FIG. 9A, when the maximum phase of the fundamental three-phase voltage commands Vub, Vvb, and Vwb exceeds the inverter output upper limit value VH_limit (=0.5 Vdc), the subtraction unit 7 uses the offset voltage Voffset to shift the maximum phase downward so that the maximum phase out of the voltage commands Vu, Vv, and Vw matches the inverter output upper limit value 0.5 Vdc as illustrated in FIG. 9B. As a result, the waveforms of the voltage commands Vu, Vv, and Vw always do not exceed the inverter output upper limit value 0.5 Vdc. Similarly, as illustrated in FIG. 9A, when the minimum phase of the fundamental three-phase voltage commands Vub, Vvb, and Vwb falls below the inverter output lower limit value VL_limit (=−0.5 Vdc), the subtraction unit 7 uses the offset voltage Voffset to shift the minimum phase upward so that the minimum phase out of the voltage commands Vu, Vv, and Vw matches the inverter output lower limit value −0.5 Vdc as illustrated in FIG. 9B. As a result, the waveforms of the voltage commands Vu, Vv, and Vw always do not fall below the inverter output lower limit value −0.5 Vdc.

Next, referring to FIG. 9, a description is now given of the operation of the three-phase voltage command calculator 5B in the fourth embodiment. In this state, a period required by the phase current detection sensor 83 to accurately detect the phase current Iw_s is referred to as a current detection period Tc. In the fourth embodiment, Tc=5 µs and the switching cycle Ts=50 µs are set. In this state, current detection by the phase current detection sensor 83 requires a condition that the on-duty of the upper arm switching element Swp in the W phase is equal to or shorter than 1−Tc/Ts=0.9. Thus, in FIG. 9, as "a voltage level at which the lower arm ON period=Tc", the lower arm ON period is set to a voltage of 0.4 Vdc at which the on-duty of the upper arm switching element is 0.9.

Figure 10:
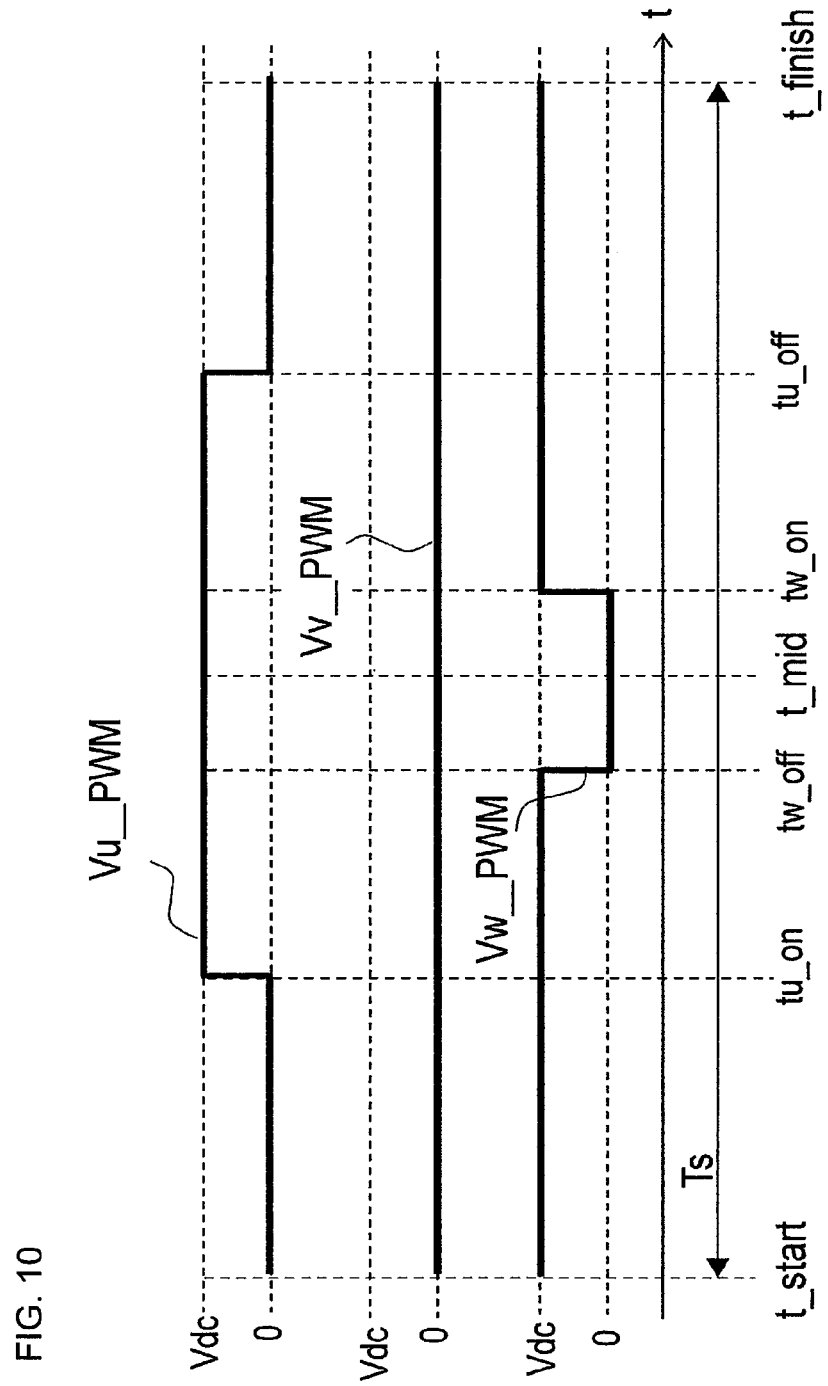
FIG. 10 is a diagram for illustrating waveforms of three-phase terminal voltages at X in a section A in which current supply periods of lower arm switching elements in the V phase and the W phase are equal to or longer than Tc in the inverter device according to the fourth embodiment of the present invention.

Then, in FIG. 5, a section in which the voltage of the upper arm switching elements Svp and Swp in the V phase and the W phase in which the carrier triangle waves are in phase are equal to or less than 0.4 Vdc, in other words, a section in which the current supply period of the lower arm switching elements Svn and Swn in the V phase and the W phase are equal to or longer than Tc is set to a section A of FIG. 9B. FIG. 10 is a diagram for illustrating the waveforms of the three-phase terminal voltages Vu_PWM, Vv_PWM, and Vw_PWM at X in the section A. In this case, a period from a time point tw_off to a time point tw_on is longer than the current detection period Tc in the W phase, and thus the phase current detection sensor 83 detects the phase current Iw_s at the center time point t_mid (the time point at which the carrier triangle wave reaches the maximum value). Then, the phase current Iw_s output from the phase current detection sensor 83 is input to the three-phase voltage command calculator 5B. Moreover, as illustrated in FIG. 10, Vu_PWM=Vdc, Vv_PWM=0, and Vw_PWM=0 are satisfied at the center time point t_mid, and thus it is understood that Idc_s is equal to Iu based on FIG. 4. Thus, the power supply current Idc_s detected by the power supply current detection sensor 81 at the center time point t_mid is input to the three-phase voltage command calculator 5B. The three-phase voltage command calculator 5B refers to the table of FIG. 4, and uses Iu_s=Idc_s to control the currents. As subsequent processing in the three-phase command calculator 5B, processing equivalent to Expression (4) to Expression (8) described in the first embodiment is only required to be executed.

Figure 11:
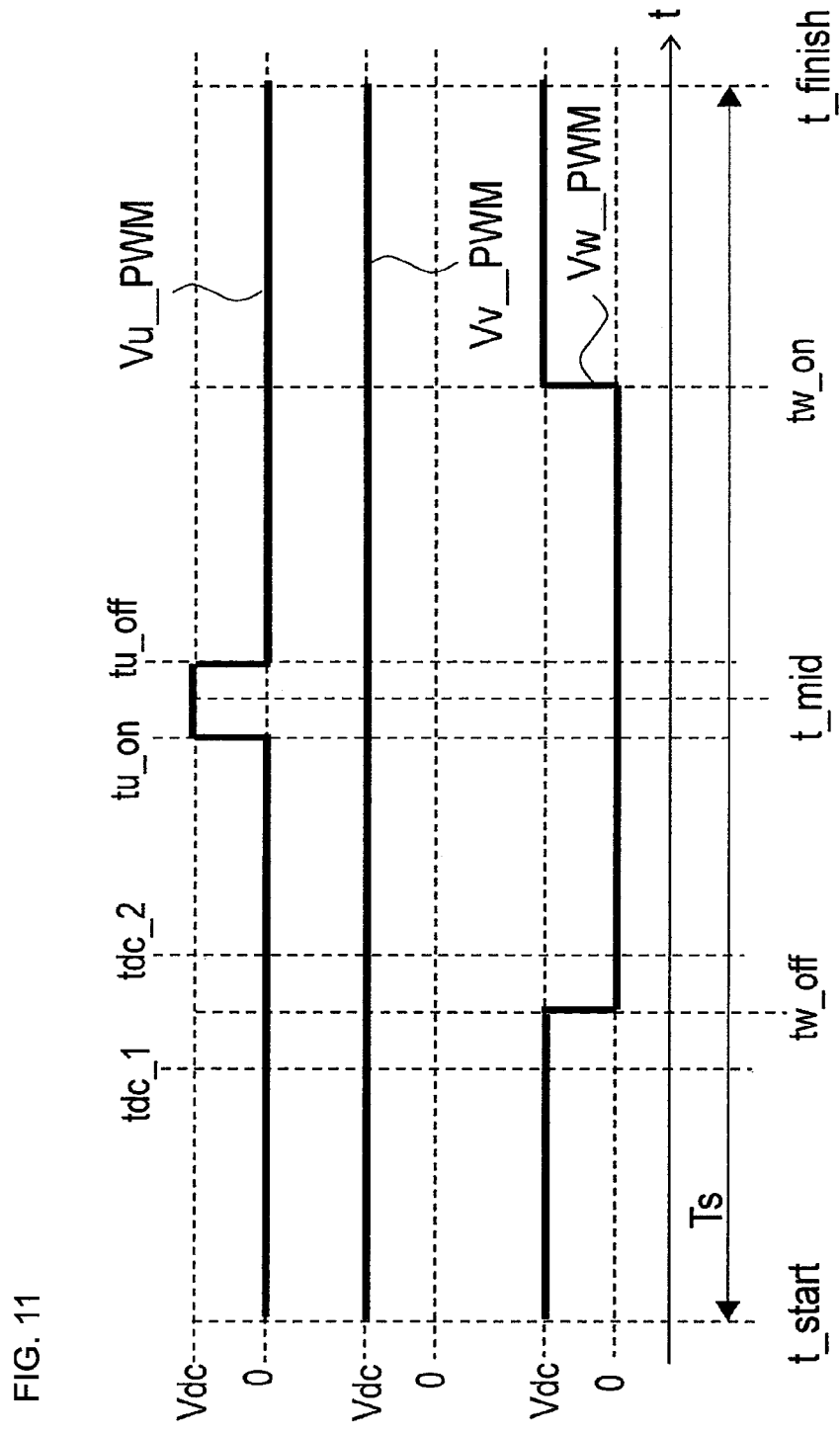
FIG. 11 is a diagram for illustrating the waveforms of the three-phase terminal voltages at Y in a section C in which the current supply period of the lower arm switching element in the V phase is shorter than Tc in the inverter device according to the fourth embodiment of the present invention.

Then, in FIG. 5, a section in which the on-duty of the upper arm switching element Svp in the V phase is higher than 0.4 Vdc, in other words, a section in which the current supply period of the lower arm switching element Svn is shorter than Tc is set to a section C of FIG. 9B. FIG. 11 is a diagram for illustrating the waveforms of the three-phase terminal voltages Vu_PWM, Vv_PWM, and Vw_PWM at Y in the section C. In this case, the interval between the time point tu_on and the center time point t_mid is narrow, and the influence of pulsation on the phase current Iw_s and the power supply current Idc_s by turning on of the U phase remains at the center time point t_mid. Therefore, the detection accuracies of the phase current Iw_s and the power supply current Idc_s are low. Thus, in this case, the power supply current detection sensor 81 detects the power supply current Idc_s twice in total before and after the switching time point tw_off or tw_on in the W phase, which is the middle phase. In the fourth embodiment, as illustrated in FIG. 11, the power supply current Idc_s is detected at a time point tdc_1 before the switching time point tw_off of the middle phase and at a time point tdc_2 after the switching time point tw_off. In the following, the power supply current Idc_s detected at the time point tdc_1 is set to Idc_s1, and the power supply current Idc_s detected at the time point tdc_2 is set to Idc_s2. In this state, the power supply current Idc_s1 detected at the time point tdc_1 is equal to −Iu based on FIG. 4. The power supply current Idc_s2 detected at the time point tdc_2 is equal to Iv based on FIG. 4. Thus, the power supply currents Idc_s1 and Idc_s2 are detected, and are used as −Iu_s and Iv_s, respectively, in the three-phase voltage command calculator 5B. Then, the processing described in the first embodiment is only required to be executed. Moreover, fluctuation (switching) occurs in the three-phase terminal voltages Vu_PWM, Vv_PWM, and Vw_PWM in a vicinity of the time point t_mid also in B, C, and D of FIG. 9, and it is difficult to detect the power supply current Idc_s and the phase current Iw_s at the center time point t_mid. Thus, the power supply current Idc_s is detected twice in total before and after the time point at which the middle phase switches also in the sections B, C, and D. The detected currents are input to the three-phase voltage calculator 5B, and the phase currents in the two phases are reproduced by using the table of FIG. 4 in the three-phase voltage command calculator 5B so that the current control based on the phase currents in the three phases can always be executed.

Figure 12:
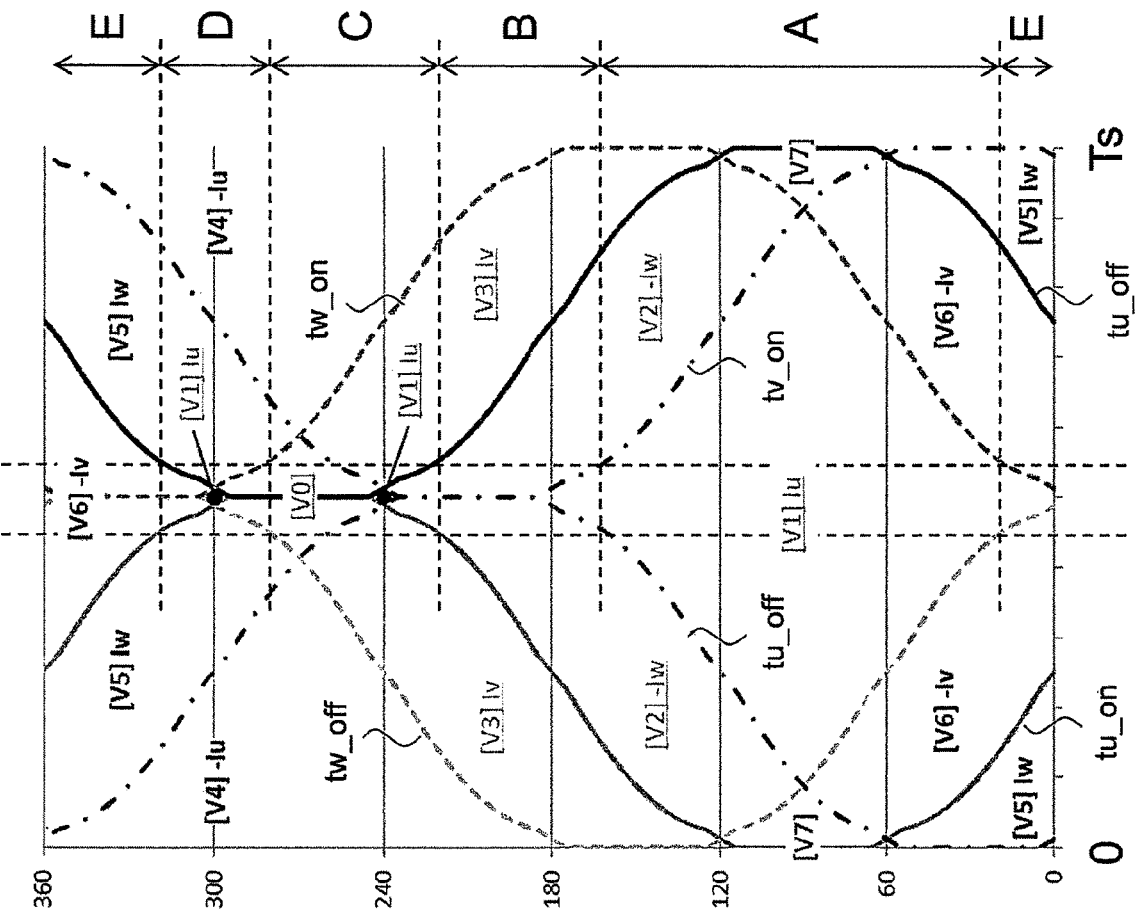
FIG. 12 is a timing chart for illustrating a timing of turning on or turning off at each electrical angle of the switching element in each phase of the inverter device according to the fourth embodiment of the present invention.

The voltage commands Vu, Vv, and Vw are illustrated in FIG. 9, and turning on and turning off in electrical angle of each of the voltage commands Vu, Vv, and Vw are illustrated in FIG. 12 in which one cycle of the switching is assigned to a horizontal axis, and one cycle of the electrical angle is set to a vertical axis. [V1] to [V7] indicate voltage vectors shown in FIG. 4. The phase currents acquired by the detection of the power supply current Idc_s are additionally indicated next thereto. Moreover, Iw_s is acquired by the phase current detection sensor 83 in underlined regions. A description is now given of a current detection method in a case in which the electrical angle is 240 deg. An interval between the time point tu_on and the time point t_mid and an interval between the time point tv_off and the time point t_mid are narrow, and the influence of the pulsation remains in the detection at the center time point t_mid. Thus, the power supply current Idc_s and the phase current Iw_s are detected at a timing of, for example, tw_off+Tc before tu_on and tv_off. The voltage vector is V3, and Iv can thus be detected as the power supply current Idc_s. As subsequent processing in the three-phase command calculator 5B, processing equivalent to Expression (4) to Expression (8) described in the first embodiment is only required to be executed. Moreover, also in the case in which the electrical angle is 300 deg, the interval between the time point tu_on and the time point t_mid and an interval between the time point tw_off and the time point t_mid are narrow, and the influence of the pulsation remains in the detection at the center time point t_mid. Thus, the power supply current detection sensor 81 and the phase current detection sensor 83 detect the power supply current Idc_s and the phase current Iw_s at a timing of, for example, tu_off-α (α is a positive value) before tu_on and tv_off. The voltage vector is V4, and −Iu can thus be detected as the power supply current Idc_s. As subsequent processing in the three-phase command calculator 5B, processing equivalent to Expression (4) to Expression (8) described in the first embodiment is only required to be executed. That is, the current control based on the phase currents in the three phases can always be executed by detecting the power supply current and the phase current at the timing at which the voltage vector corresponding to the current in any phase in which the phase current cannot be detected can be detected is output, inputting the power supply current and the phase current into the three-phase voltage calculator 5B, and reproducing the phase currents in the two phases in the three-phase voltage command calculator 5B.

Further, in a case in which the electrical angle is 240 deg, the power supply current Idc_s1 may be detected at the timing of tw_off-α, and the power supply current Idc_s2 and the phase current Iw_s may be detected at the timing of tw_off+Tc. In this state, the power supply current Idc_s1 is −Iu, and the power supply current Idc_s2 is Iv. Thus, the current control can also be executed based on those phase currents in the three phases.

Moreover, in FIG. 12, in a region slightly beyond 180 deg in the section B, a vicinity of 270 deg in the section C, and a region slightly before 360 deg in the section E, that is, when the voltage command in one phase out of the voltage commands matches the output upper limit value or the output lower limit value, and the on-duties in the other two phases are equal to or longer than Tc and equal to or shorter than (Ts−Tc)/Ts, the power supply current can be detected by the power supply current detection sensor at the time point t_mid. Thus, the three-phase voltage command calculator 5B may be set to calculate the fundamental three-phase voltage commands based on the power supply current As described above, in the fourth embodiment, when the respective current supply periods of the lower arm switching elements corresponding to the W phase and the V phase are equal to or longer than the current detection period Tc, the three-phase voltage command calculator 5B acquires the power supply current and the phase current detected by the power supply current detection sensor 81 and the phase current detection sensor 83 at a maximum value time point, which is the time point at which the carrier triangle wave C2 reaches the maximum value, and uses the acquired currents so as to calculate the phase voltage commands Vu, Vv, and Vw. In this case, the current supply period of the switching element is equal to or longer than the current detection period Tc, and there is no influence of the pulsation caused by turning on or turning off of the switching element. Thus, the power supply current and the phase current are only required to be detected at the maximum value time point at which the carrier triangle wave C2 reaches the maximum value.

Moreover, when a current supply period of the lower arm switching element corresponding to the V phase is shorter than the current detection period Tc, or a current supply period of the upper arm switching element corresponding to the U phase is shorter than the current detection period Tc, the three-phase voltage command calculator 5B detects currents flowing in at least two phases out of the three phases of the three-phase inverter through the power supply current detection sensor 81 detecting the power supply current at least twice in a cycle of the carrier triangle wave C1 or the carrier triangle wave C2, and use the detected currents so as to calculate the phase voltage commands. In this case, the influence of the pulsation caused by turning on or turning off of the switching element remains, and the detection accuracy can be prevented from degrading by detecting the power supply current at least twice and detecting the currents flowing in at least two phases out of the three phases of the three-phase inverter.

Moreover, when the W phase, the V phase, and the U phase are set to a maximum phase, a middle phase, and a minimum phase, respectively, in descending order of an amplitude of the phase voltage command, the three-phase voltage command calculator 5B detects currents flowing in the maximum phase and the minimum phase through the power supply current detection sensor 81 detecting the power supply current twice before and after a switching timing of the upper arm switching element corresponding to the middle phase, and use the detected currents so as to calculate the phase voltage commands. As a result, the influence of the pulsation can be reduced, to thereby be able to prevent the detection accuracy from degrading.

Moreover, when a current supply period of the lower arm switching element corresponding to any one of the W phase and the V phase is shorter than a current detection period Tc, or a current supply period of the upper arm switching element corresponding to the U phase is shorter than the current detection period Tc, the phase current detection sensor 83 detects the current flowing in the W phase at a timing at which a period equal to or longer than the current detection period Tc is secured, and the power supply current detection sensor 81 detects the power supply current at least once in a cycle of the carrier triangle wave C1 or the carrier triangle wave C2, so that the three-phase voltage command calculator 5B detects the current flowing in at least one phase out of the V phase and the U phase, and calculates the phase voltage commands based on the detected currents. As a result, the influence of the pulsation can be reduced, to thereby be able to prevent the detection accuracy from degrading.

Moreover, the three-phase voltage command calculator 5B is configured to detect currents flowing in at least two phases out of the three phases of the three-phase inverter by the power supply current detection sensor 81 and the phase current detection sensor 83 detecting the power supply current and the phase current, respectively, at a timing at which a period equal to or longer than the current detection period Tc is secured in the W phase, and use those detected currents so as to calculate the phase voltage commands. As a result, the influence of the pulsation can be reduced, to thereby be able to prevent the detection accuracy from degrading.

Moreover, when the phase voltage command matches an output upper limit value or an output lower limit value of the three-phase inverter in the V phase and the U phase out of the three phases of the three-phase inverter, and a current supply period of the lower arm switching element corresponding to the W phase is equal to or longer than Tc, the three-phase voltage command calculator 5B uses the power supply current and the phase current detected by the power supply current detection sensor 81 and the phase current detection sensor 83, respectively, at a maximum value time point, which is a time point at which the carrier triangle wave C2 reaches the maximum value, so as to calculate the voltage commands. As a result, the influence of the pulsation can be reduced, to thereby be able to prevent the detection accuracy from degrading.

Fifth Embodiment

In a fifth embodiment of the present invention, a description is not given of parts overlapping with those of the first to fourth embodiments. The fifth embodiment is different from the fourth embodiment in an inverter on/off signal generation unit 8C. That is, a configuration of the inverter device and the electric power steering apparatus according to the fifth embodiment is such a configuration that the inverter on/off signal generation unit 8C is provided in place of the inverter on/off signal generation unit 8A in the configuration of FIG. 7. Therefore, in the fifth embodiment, a description is given with reference to FIG. 7, and illustration thereof is omitted.

Figure 13:
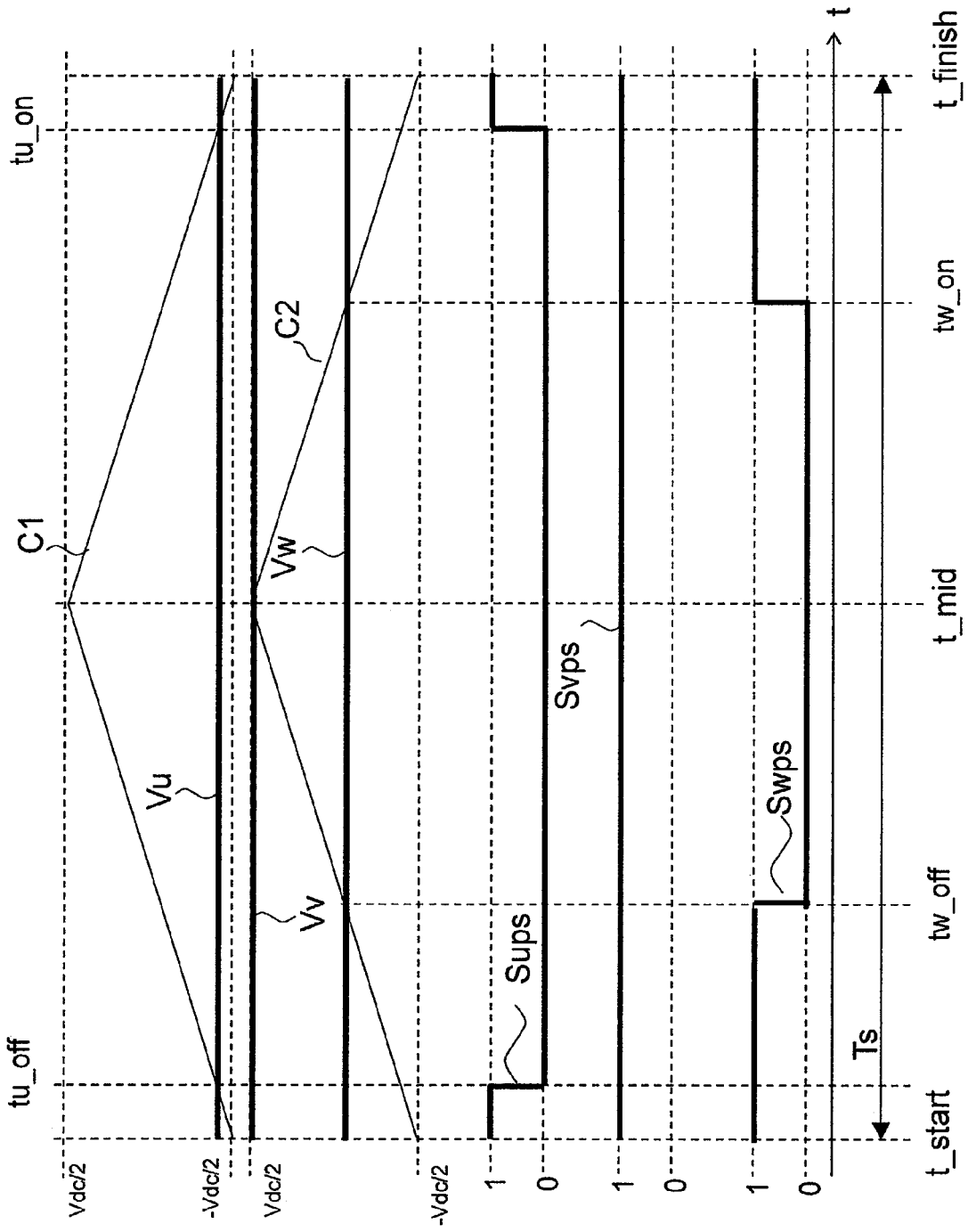
FIG. 13 is an operation explanatory diagram for illustrating the operation of the inverter on/off signal generation unit in the inverter device according to a fifth embodiment of the present invention.

When an amplitude Vamp of the voltage command calculated through use of Expression (9) exceeds an upper limit value set in advance, or the voltage command in the W phase for which the phase current detection sensor 83 is provided exceeds an upper limit value set in advance based on the current detection period Tc, the carrier triangle waves for the three phases are set so as to be in phase in the inverter on/off signal generation unit 8C as illustrated in FIG. 13. FIG. 13 is different from FIG. 5 described in the second embodiment in that the carrier triangle wave C1 is in phase with the carrier triangle wave C2.

$$V_{amp} = \sqrt{\frac{2}{3}(V_u^2 + V_v^2 + V_w^2)} \quad (9)$$

Moreover, the three-phase voltage commands Vu, Vv, and Vw of FIG. 13 have values at Y of FIG. 9. The carrier triangle wave C1 has the phase difference of 180 degrees with respect to the carrier triangle wave C2 in FIG. 11 in the fourth embodiment, and thus the switching tu_on in the U phase to be compared with the carrier triangle wave C1 occurs in a vicinity of the center time point t_mid, which is the current detection time point, with the result that the detection accuracies of the power supply current and the phase current deteriorate. Therefore, when the amplitude Vamp of the voltage command exceeds the upper limit value set in advance, or the voltage command in the W phase for which the phase current detection sensor 83 is provided exceeds the upper limit value set in advance, the carrier triangle wave C1 is set so as to be in phase with the carrier triangle wave C2. As a result of this operation, the switching time points tu_off and tu_on in the U phase occur at positions separated from the center time point t_mid, which is the current detection time point, and thus the power supply current and the phase current can be detected at the center time point t_mid also in the sections other than the section A of FIG. 9. Therefore, there is provided such an effect that the phase at which the average value of the output current of the inverter in the carrier cycle can be detected increases.

Sixth Embodiment

Figure 14:
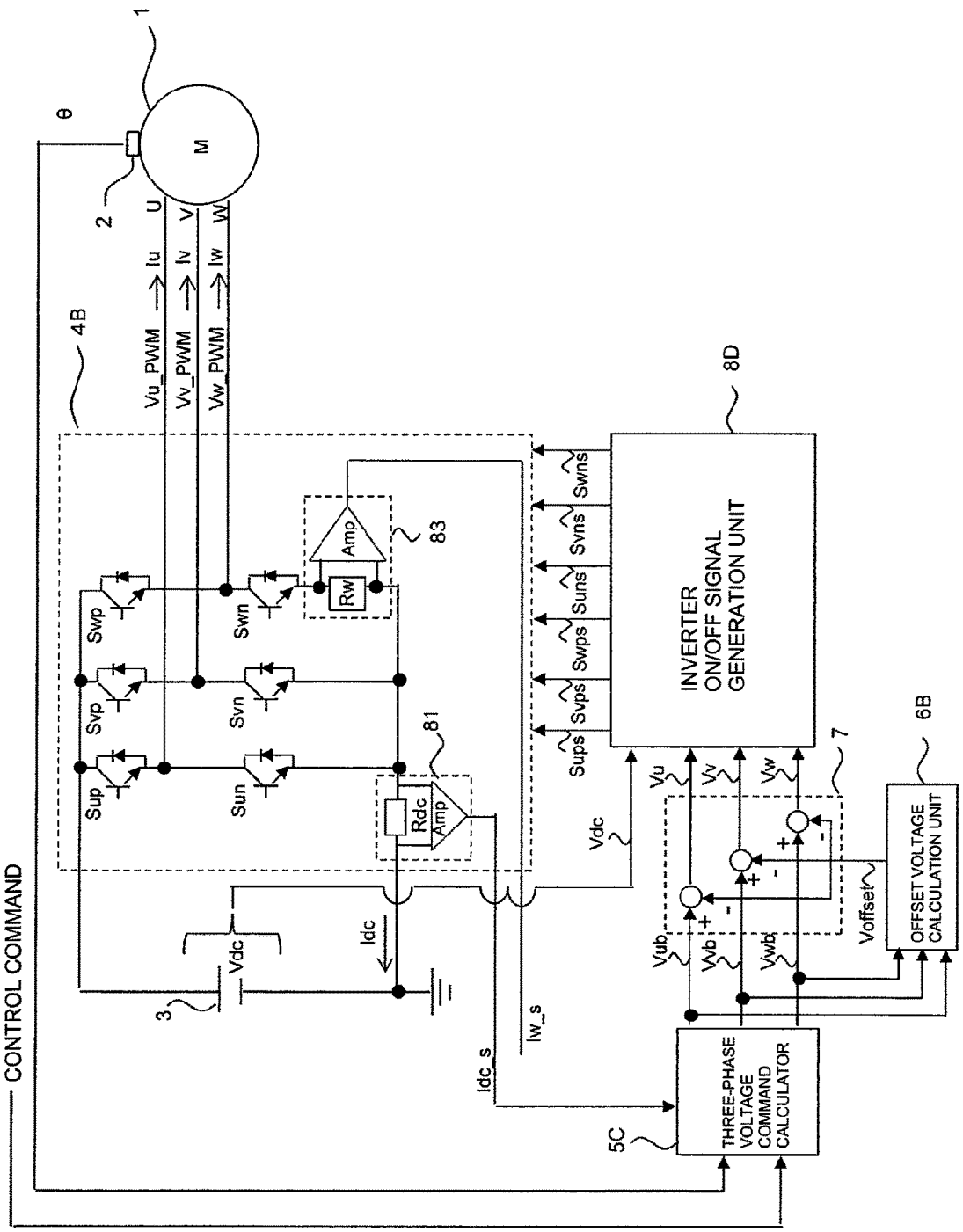
FIG. 14 is a configuration diagram for illustrating the configuration of the inverter device and the electric power steering apparatus according to a sixth embodiment of the present invention.

FIG. 14 is a configuration diagram for illustrating a configuration of the inverter device and the electric power steering apparatus according to a sixth embodiment of the present invention. In the sixth embodiment, a description is omitted for parts overlapping with those of the first to fifth embodiments. The fifth embodiment is different from the fourth embodiment in a three-phase voltage command calculator 5C and the inverter on/off signal generation unit 8D, and also in that the phase current detection sensor 83 has a failure. The three-phase voltage command calculator 5C determines that the phase current detection sensor 83 has a failure when the phase current Iw_s is not input from the phase current detection sensor 83, or the value of the phase current Iw_s deviates from a normal range set in advance.

A description is now given of the inverter on/off signal generation unit 8D. First, the three-phase voltage commands Vu, Vv, and Vw are converted to the on-duty commands Du, Dv, and Dw based on Expression (1), Expression (2), and Expression (3).

Figure 15:
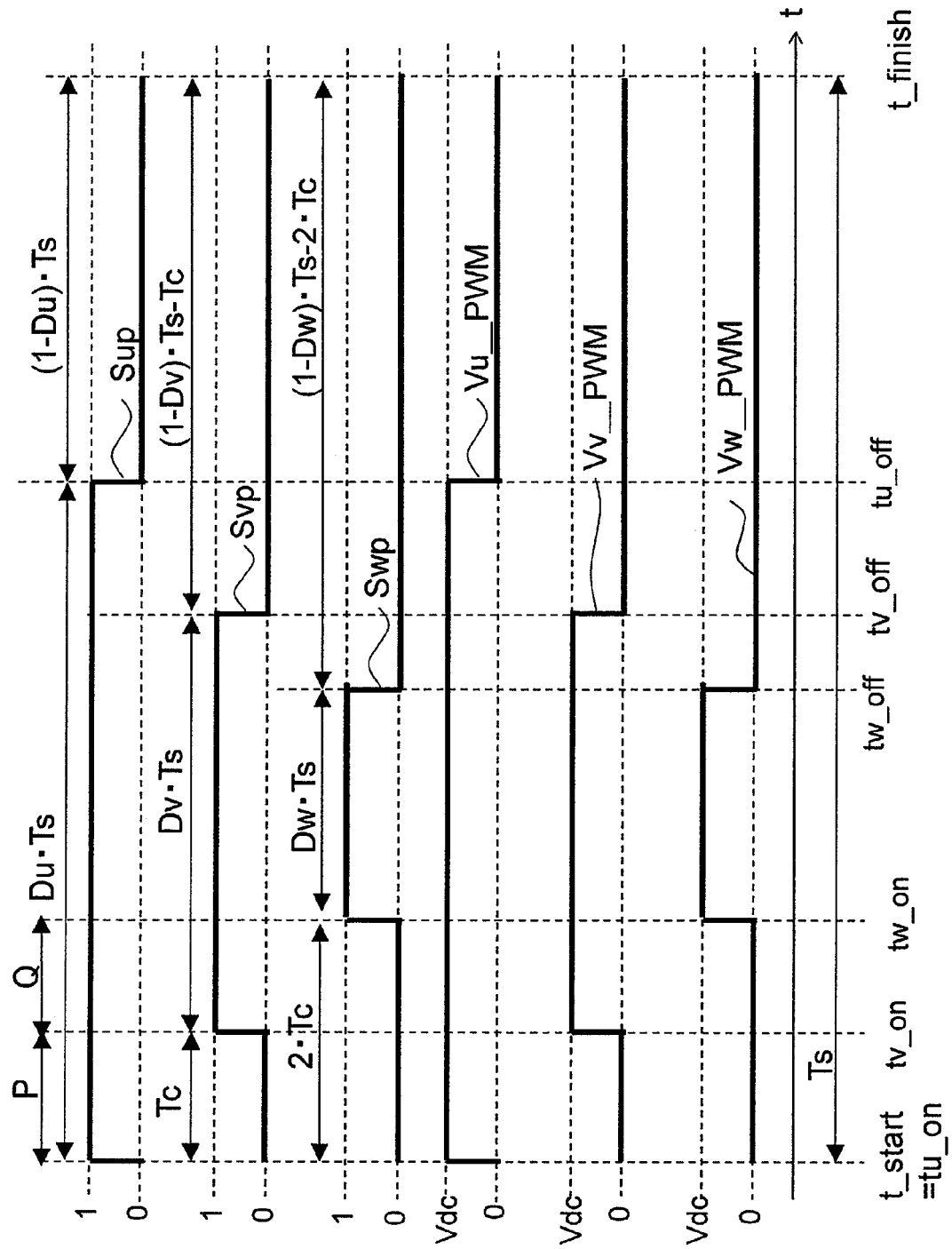
FIG. 15 is a timing chart for illustrating the relationships between the on/off states of the upper arm switching elements and the three-phase terminal voltages output from the inverter in the inverter device according to the sixth embodiment of the present invention.

FIG. 15 is a timing chart for illustrating the relationships between the upper arm switching elements Sup, Svp, and Swp of the inverter 4B and the three-phase terminal voltages Vu_PWM, Vv_PWM, and Vw_PWM output from the inverter 4B in the switching cycle Ts (Ts is, for example, 50 μs) of the inverter 4B. First, in the U phase, the upper arm switching element Sup is turned "on", that is, set to 1 at the time point t_start, remains in this state in the period Du×Ts, and is turned off, that is, set to 0 at the time point tu_off.

Moreover, in the V phase, the upper arm switching element Svp is turned "off", that is, set to 0 in the period Tc starting from the time point t_start, the upper arm switching element Svp is turned on, that is, set to 1 at the time point Tv_on after Tc has elapsed, remains in this state in the period Du×Ts, and is turned off, that is, set to 0 at the time point tv_off.

Further, in the W phase, the upper arm switching element Swp is turned "off", that is, set to 0 in the period 2×Tc starting from the time point t_start, the upper arm switching element Swp is turned on, that is, set to 1 at the time point Tw_on after 2×Tc has elapsed, remains in this state in the period Dw×Ts, and is turned off, that is, set to 0 at the time point tw_off.

The three-phase terminal voltages Vu_PWM, Vv_PWM, and Vw_PWM have waveforms synchronized with the ons/offs of the upper arm switching elements Sup, Svp, and Swp, respectively.

A characteristic of FIG. 15 is that the "on" periods are fixed. The U phase always turns on at t_start. The V phase always turns on when Tc has elapsed from t_start. The W phase always turns on when 2×Tc has elapsed from t_start. Thus, the "on" periods are always fixed. Meanwhile, the "off" time points in the respective phases vary in accordance with the duties (Du, DV, and Dw) in the respective phases. With such a switching method, a state P (Sup=1, Svp=0, and Swp=0) illustrated in FIG. 15 continues for the current detection period Tc, and a state Q (Sup=1, Svp=1, and Swp=0) continues for the current detection period Tc. On the basis of FIG. 4, the state P is equivalent to the voltage vector V1, and the state Q is equivalent to the voltage vector V2. When V1 to V6 other than V0 and V7, which are zero vectors, are defined as effective vectors of FIG. 4, two types of effective vectors V1 and V2 are output in the current detection period Tc by the switching of FIG. 15, respectively.

A description is now given of the operation of the three-phase voltage command calculator 5C. The power supply current is detected by the power supply current detection sensor 81 once at a time point in the state P and, then, once at a time point in the state Q in the three-phase voltage command calculator 5C. The power supply current in the state P is equal to Iu based on FIG. 4, and thus Iu can be detected based on the power supply current detected at the time point in the state P. Then, the power supply current in the state Q is equal to −Iw based on FIG. 4, and thus Iw can be detected based on the power supply current detected at the time point in the state Q. The same calculation as that in the three-phase voltage calculator 5A is executed through use of the currents Iu and Iw flowing in the two phases detected in the states P and Q, respectively, to thereby calculate the fundamental three-phase voltage commands Vub, Vvb, and Vwb.

As described above, in the sixth embodiment, the control unit is configured so that when a failure of the phase current detection sensor 83 is detected, the inverter 4B generates the on/off signals so as to output the two types of effective vectors, the currents corresponding to the effective vectors are detected in the power supply current detection sensor 81, and the three-phase voltage command calculator 5C calculates the fundamental three-phase voltage commands based on the currents. As a result, there is provided such an effect that even when the phase current detection sensor 83 has a failure, the current control for the AC motor can be continued.

In the sixth embodiment, a description is given of the example in which the U phase, the V phase, and the W phase turn on in the stated order, but the order of turning on is not limited to this example. For example, the W phase, the U phase, and the V phase may turn on in the stated order, and Iw and Iv may be generated, respectively, from the power supply current during the periods of the generated effective vectors V5 and V6, to thereby be able to execute the same control. Moreover, the order of turning on may be switched in accordance with the amplitude relationship of the voltage commands.

Seventh Embodiment

Figure 16:
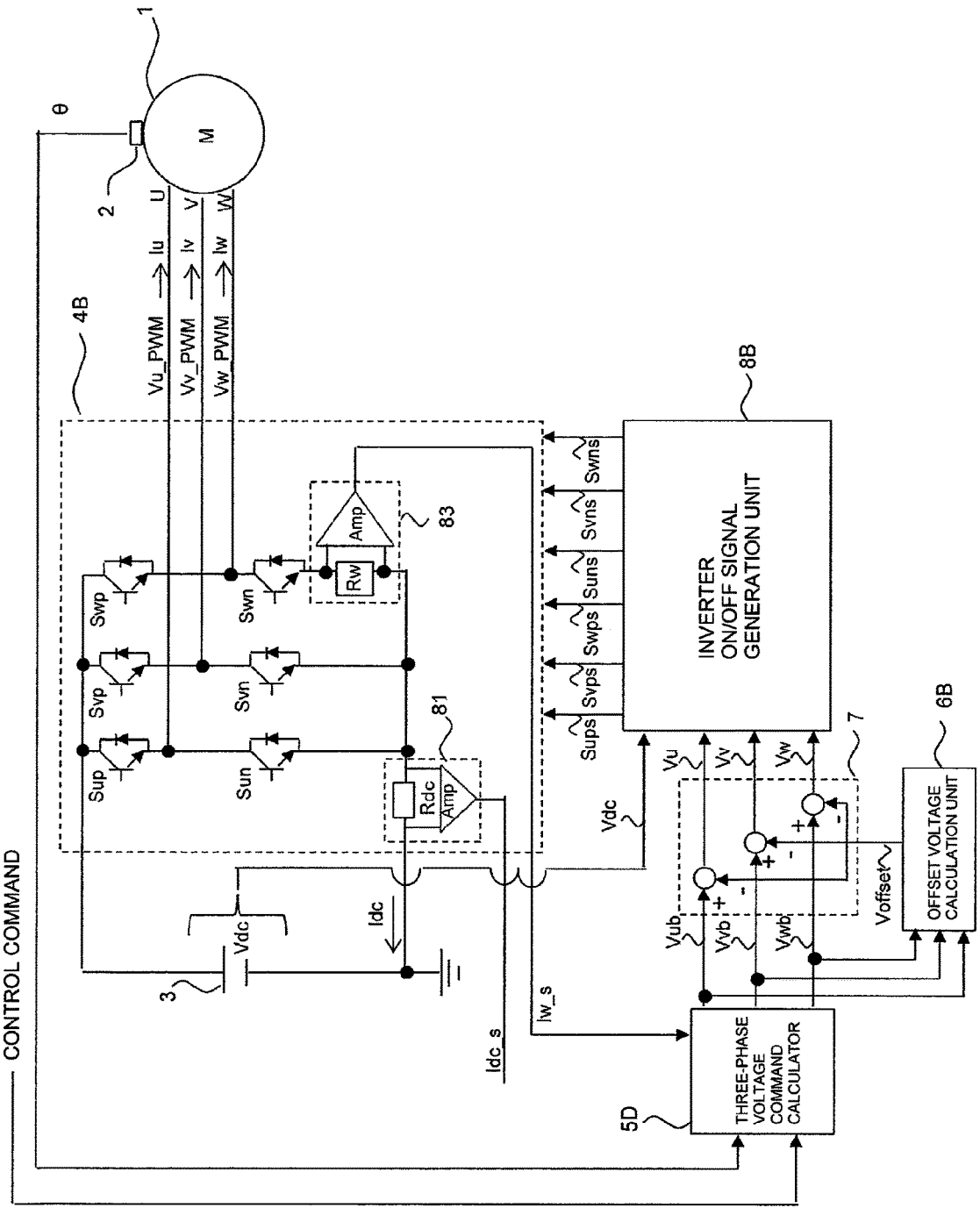
FIG. 16 is a configuration diagram for illustrating the configuration of the inverter device and the electric power steering apparatus according to a seventh embodiment of the present invention.

FIG. 16 is a configuration diagram for illustrating a configuration of the inverter device and the electric power steering apparatus according to the seventh embodiment of the present invention. In the seventh embodiment, a description is omitted for parts overlapping with those of the first to third embodiments. The seventh embodiment is different from the third embodiment of FIG. 6 in a three-phase voltage command calculator 5D in that the power supply current detection sensor 81 has a failure. The three-phase voltage command calculator 5D determines that the power supply current detection sensor 81 has a failure when the power supply current Idc_s is not input from the power supply current detection sensor 81, or the value of the power supply current Idc_s deviates from a normal range set in advance.

The seventh embodiment relates to an operation in a case where the failure of the power supply current detection sensor 81 is detected, and the three-phase voltage command calculator 5D cannot use the power supply current Idc_s, and uses the Iw_s detected by the phase current detection sensor 83 so as to calculate the fundamental three-phase voltage commands Vub, Vvb, and Vwb. A description is now given of the method.

The current commands id_target and iq_target on the rotating two axes are set to the control command as in the first embodiment. Those current commands are set as given by Expression (10) and Expression (11).

$$id\_target = 0 \tag{10}$$

$$iq\_target = (\sqrt{3}/\sqrt{2}) \times Iamp \tag{11}$$

In this state, the phase current Iw_s detected by the phase current detection sensor 83 is given by Expression (12) ($\theta$ is the rotor magnetic pole position as described in the first embodiment).

$$Iw\_s = Iamp' \times \cos(\theta + \pi/2 + 2\pi/3) \tag{12}$$

Iw_s and $\cos(\theta + \pi/2 + 2\pi/3)$ are known in this state, and Iamp' is calculated based on Expression (13).

$$Iamp' = Iw\_s / \cos(\theta + \pi/2 + 2\pi/3) \tag{13}$$

Estimated values of Iu_s and Iv_s, which cannot be detected, are given by Expression (14) and Expression (15), respectively.

$$Iu\_s = Iamp' \times \cos(\theta + \pi/2) \tag{14}$$

$$Iv\_s = Iamp' \times \cos(\theta + \pi/2 - 2\pi/3) \tag{15}$$

As described above, the fundamental three-phase voltage commands Vub, Vvb, and Vwb can be calculated through use of Iw_s detected by the phase current detection sensor 83, and Iu_s and Iv_s estimated through use of Iw_s based on Expression (5) to Expression (8) described in the first embodiment.

As described above, in the seventh embodiment, there is provided such a configuration that the currents in at least two phases are estimated based on the phase current detection value detected by the phase current detection sensor 83 when the power supply current detection sensor 81 has a failure, and the fundamental three-phase voltage commands Vub, Vvb, and Vwb are calculated in the three-phase voltage command calculator 5D based on those currents, and thus there can be provided such an effect that the current control for the AC motor 1 can be continued even if the power supply current detection sensor 81 has a failure.

Eighth Embodiment

Figure 17:
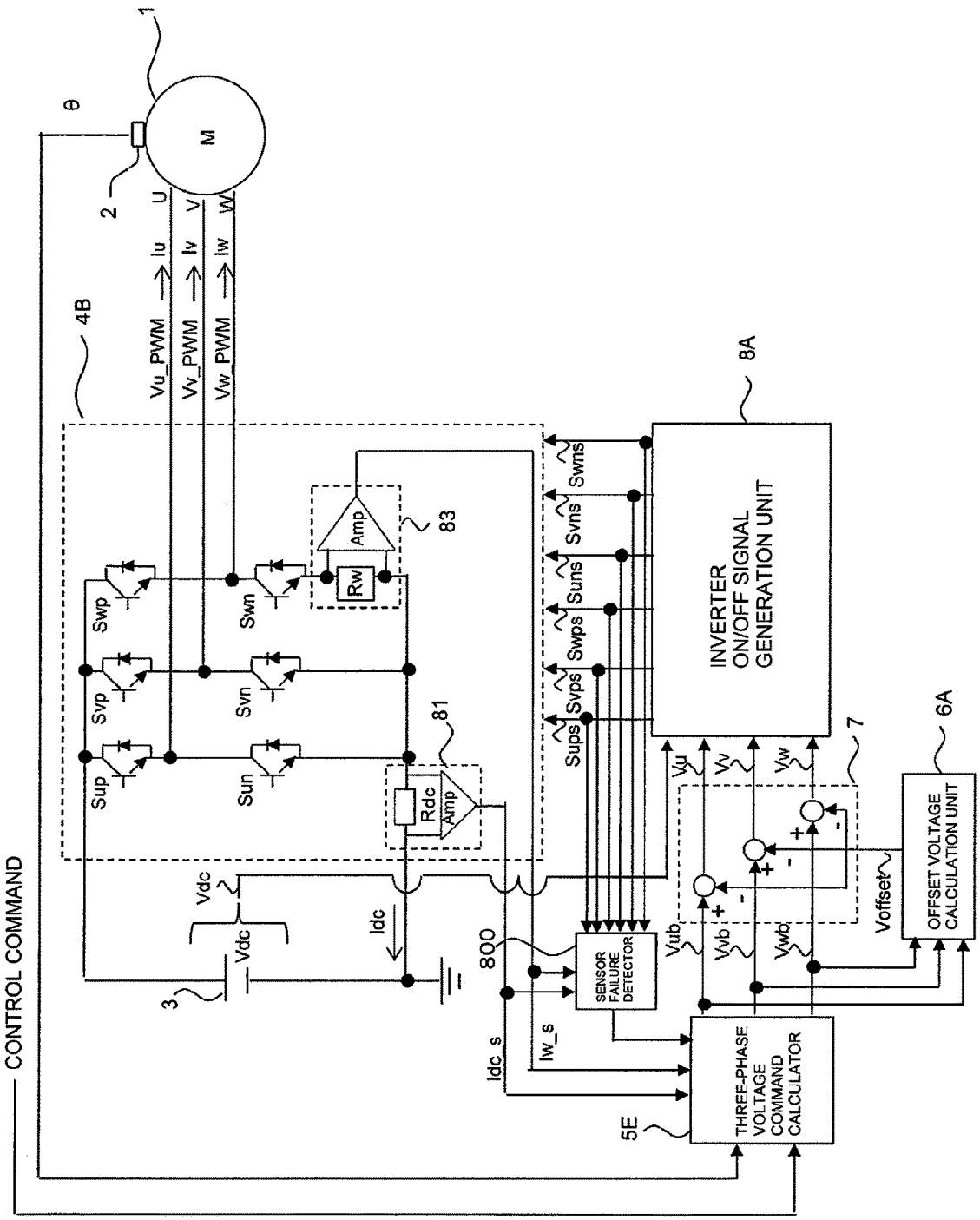
FIG. 17 is a configuration diagram for illustrating the configuration of the inverter device and the electric power steering apparatus according to an eighth embodiment of the present invention.

FIG. 17 is a configuration diagram for illustrating a configuration of the inverter device and the electric power steering apparatus according to the eighth embodiment of the present invention. In the eighth embodiment, a description is omitted for parts overlapping with those of the first to third embodiments. The eighth embodiment is different from the third embodiment of FIG. 3 in a three-phase voltage command calculator 5E and a sensor failure detector 800.

The sensor failure detector 800 is configured to detect a failure of the power supply current detection sensor 81 and a failure of the phase current detection sensor 83 based on the power supply current detection value Idc_s, the phase current detection value Iw_s, and the on/off signals Sups to Swns, and output a failure signal to the three-phase voltage command calculator 5E.

A detailed description is now given of an operation of the sensor failure detector 800. The sensor failure detector 800 determines in which state of V0 to V7 of FIG. 4 the voltage vector is in accordance with the input on/off signals Sups to Swns. When the voltage vector is, for example, the V2 vector, Idc_s and Iw_s are detected. Idc_s matches −Iw based on FIG. 4 in this state. Therefore, the absolute value of Idc_s and the absolute value of Iw_s almost match each other when the power supply current detection sensor 81 and the phase current detection sensor 83 do not have a failure. Thus, it is determined that a failure does not exist when Expression (16) is satisfied, and it is determined that a failure exists when Expression (16) is not satisfied where Ith is a threshold value defined in advance.

$$||Idc\_s|-|Iw\_s||<|Ith| \quad (16)$$

A description is now given of the operation of the three-phase voltage command calculator 5E. When the sensor failure detector 800 determines that the failure does not exist, the three-phase voltage command calculator 5E executes the same operation as that of the three-phase voltage command calculator 5A described in the first embodiment. Meanwhile, when the sensor failure detector 800 determines that the failure exists, the three-phase voltage command calculator 5E executes the following operation.

The three-phase voltage command calculator 5E sets the control command to the current commands id_target and iq_target on the rotating two axes, and uses those current commands and motor constants of the AC motor 1 so as to calculate the voltage commands Vd and Vq on the rotating two axes based on Expressions (17) and (18).

$$Vd=R\times id\_target-\omega\times Lq\times iq\_target \quad (17)$$

$$Vq=R\times iq\_target+\omega\times(Ld\times id\_target+\varphi) \quad (18)$$

In Expression (17) and Expression (18), R, Ld, Lq, and φ are a winding resistance, a self-inductance relating to the d axis, a self-inductance relating to the q axis, and an inter-linkage magnetic flux number of the AC motor 1, respectively.

Then, the voltage command Vd relating to the d axis, the voltage command Vq relating to the q axis, and the rotor magnetic pole position θ are used to calculate the fundamental three-phase voltage commands Vub, Vvb, and Vwb given by Expression (19).

$$\begin{pmatrix} v_{ub} \\ v_{vb} \\ v_{wb} \end{pmatrix} = \frac{\sqrt{2}}{\sqrt{3}} \begin{bmatrix} \cos(\theta) & -\sin(\theta) \\ \cos\left(\theta-\frac{2\pi}{3}\right) & -\sin\left(\theta-\frac{2\pi}{3}\right) \\ \cos\left(\theta+\frac{2\pi}{3}\right) & -\sin\left(\theta+\frac{2\pi}{3}\right) \end{bmatrix} \begin{bmatrix} v_d \\ v_q \end{bmatrix} \quad (19)$$

The fundamental three-phase voltage commands Vub, Vvb, and Vwb can be calculated without using the actual current values of the AC motor 1 through use of the above-mentioned calculation.

As described above, in the eighth embodiment, there is provided such an effect that the current control for the AC motor 1 can be continued even when either one or both of the power supply current detection sensor 81 and the phase current detection sensor 83 have a failure by using the sensor failure detector 800 so as to detect the failures of the power supply current detection sensor 81 and the phase current detection sensor 83, and using the current commands and the electric constants (R, Ld, Lq, and φ) of the AC motor 1 so as to calculate the fundamental three-phase voltage commands Vub, Vvb, and Vwb in the three-phase voltage command calculator 5E when a failure in at least one of the sensors is detected.

Ninth Embodiment

FIG. 18 is a configuration diagram for illustrating a configuration of the inverter device and the electric power steering apparatus according to a ninth embodiment of the present invention. In the ninth embodiment, a description is omitted for parts overlapping with those of the first to eighth embodiments. The ninth embodiment is different from the eighth embodiment in that the steering wheel 901, the front wheels 902, the torque detector 903, and the gear 904 are provided, and a three-phase voltage command calculator 5F is provided in place of the three-phase voltage command calculator 5E.

In FIG. 18, the driver turns the steering wheel 901 leftward/rightward, to thereby steer the front wheels 902. The torque detector 903 is configured to detect a steering torque Tst of a steering system, and output, as the control command, the detected torque Tst to the three-phase voltage command calculator 5F. The rotor of the AC motor 1 is coupled to the steering shaft 905 through the gear 904. The AC motor 1 is configured to generate an assist torque for assisting steering by the driver.

A description is now given of the operation of the three-phase voltage command calculator 5F. The current command id_target relating to the d axis of the AC motor 1 is set to 0. The current command iq_target relating to the q axis is set as given by Expression (20) through use of the steering torque Tst.

$$iq\_target=ka\cdot Tst \quad (20)$$

In Expression (20), ka is a constant, but the value of Ka may be set so as to change in accordance with the steering torque Tst or a travel speed of a motor vehicle. iq_target is determined in accordance with Expression (20) in this case, but may be set based on publicly-known compensation control in accordance with a steering state. As subsequent processing, processing equivalent to Expression (4) to Expression (8) described in the first embodiment is only required to be executed.

A description is now given of effects of the ninth embodiment. Stability of a current controller is most important in the control for the electric power steering apparatus. A constant interval for detecting the motor current is required for securing stability of the current control. The detection timing depends on a voltage value in a section other than a peak of a carrier wave, and the current detection cycle is not constant in the method of Patent Literature 2, whereas the cycle of the PWM carrier wave is the triangle wave having the single cycle, and the motor current is detected in the vicinity of the maximum value thereof in the ninth embodiment. The cycle of the PWM carrier wave is the single cycle, and thus a cycle between the vicinity of the maximum value of the PWM carrier wave and the vicinity of the maximum value of the PWM carrier wave in the next cycle is always constant, with the result that the motor current can be detected at the constant cycle, and the stability of the current controller can be secured.

Moreover, it is required to highly accurately detect the motor current in the control for the electric power steering apparatus. A description is now given of a reason for that. When an error with respect to a true value of the detected motor current occurs, the current controller controls the motor current containing the error so as to match the current command. As a result, a torque ripple occurs in the AC motor 1, which is then transmitted to the steering wheel 901 through the gear 904, and steering feeling of the driver consequently deteriorates. From this perspective, the fundamental wave of the current is not always detected, and there is a problem in the steering feeling in Patent Literature 2. Meanwhile, in the ninth embodiment, the timing for the current detection is set to the vicinity of the maximum value of the PWM carrier wave, and thus the fundamental wave of the motor current can be detected from the motor current containing the ripple component. As a result, the motor current can highly accurately be detected, the torque ripple does not occur in the AC motor 1, and the driver can obtain satisfactory steering feeling of the steering wheel.

Moreover, downsizing is required in the electric power steering. The downsizing increases mountability to a vehicle, increases a degree of freedom of arrangement, and also contributes to downsizing of the vehicle itself. In this respect, the three current detectors are used in Patent Literature 1, whereas the configuration of the ninth embodiment is achieved by the two current detectors, and thus provides an effect excellent in downsizing.

There is provided such a configuration that the power supply current detection sensor 81 is provided on the negative side of the DC power supply in the first to ninth embodiments, but the the same current flows both on the positive side and the negative side of the DC power supply, and thus it is to be understood that there may be provided such a configuration that the power supply current detection sensor 81 is provided on the positive side of the DC power supply.

Moreover, a description is given of the three-phase AC motor 1 and the three-phase inverters 4A and 4B in the first embodiment to the ninth embodiment, but the number of the phases of the AC motor 1 and the inverters 4A and 4B is not limited to the number in this case, and may be any number.

REFERENCE SIGNS LIST

1 AC motor; 2 rotation position detector; 3 DC power supply; 4A, 4B inverter; 5A, 5B, 5C, 5D, 5E, 5F three-phase voltage command calculator; 6A, 6B offset voltage calculation unit; 7 subtraction unit; 8A, 8B, 8C, 8D inverter on/off signal generation unit; 81 power supply current detection sensor, 82 phase current detection sensor

The invention claimed is:
1. An inverter device, comprising:
a three-phase inverter configured to invert a DC voltage supplied from a DC power supply to AC voltages to output the AC voltages to an AC motor;
a power supply current detection sensor configured to detect a power supply current flowing between the DC power supply and the three-phase inverter;
a phase current detection sensor, which is provided for one phase out of three phases of the three-phase inverter, and is configured to detect a phase current flowing in the one phase; and
a controller configured to use at least one of the power supply current or the phase current so as to calculate phase voltage commands corresponding to instruction values directed to the AC voltages output by the three-phase inverter, and generate on/off signals to be output to the three-phase inverter based on the phase voltage commands,
wherein the three-phase inverter is provided with an upper arm switching element and a lower arm switching element for each of the phases, and
wherein when a time point at a center of a period in which the upper arm switching element corresponding to one phase out of the three phases of the three-phase inverter for which the phase current detection sensor is not provided is on, and the lower arm switching elements corresponding to the other two phases are on is set to a center time point, the controller uses, as the power supply current and the phase current, a power supply current and a phase current detected at the center time point, respectively, by the power supply current detection sensor and the phase current detection sensor.

2. The inverter device according to claim 1,
wherein the controller is configured to:
compare the phase voltage command and a carrier triangle wave with each other, to thereby generate the on/off signals to be output to the three-phase inverter; and
use, as the power supply current and the phase current, a power supply current and a phase current detected by the power supply current detection sensor and the phase current detection sensor, respectively, at a time point at which the carrier triangle wave reaches a peak so as to calculate the phase voltage commands, and
wherein when: the one phase out of the three phases of the three-phase inverter for which the phase current detection sensor is provided is set to a first phase, one of the two phases for which the phase current detection sensor is not provided is set to a second phase, and the other phase is set to a third phase; the carrier triangle wave used for the first phase and the second phase is set to a first carrier triangle wave; and the carrier triangle wave used for the third phase is set to a second carrier triangle wave, the second carrier triangle waver is shifted in phase by 180 degrees with respect to the first carrier triangle wave.

3. The inverter device according to claim 2, wherein when each of current supply periods of the lower arm switching elements corresponding to the first phase and the second phase is equal to or longer than a current detection period Tc, the controller acquires a power supply current and a phase current detected by the power supply current detection sensor and the phase current detection sensor at a maximum value time point, which is a time point at which the first carrier triangle wave reaches the maximum value, and use the acquired currents as the power supply current and the phase current so as to calculate the phase voltage commands.

4. The inverter device according to claim 2, wherein when a current supply period of the lower arm switching element corresponding to the second phase is shorter than the current detection period Tc, or a current supply period of the upper arm switching element corresponding to the third phase is shorter than the current detection period Tc, the controller detects currents flowing in at least two phases out of the three phases of the three-phase inverter through the power supply current detection sensor detecting the power supply current at least twice in a cycle of the first carrier triangle wave or the second carrier triangle wave, and use the detected currents so as to calculate the phase voltage commands.

5. The inverter device according to claim 4, wherein when the first phase, the second phase, and the third phase are set to a maximum phase, a middle phase, and a minimum phase, respectively, in descending order of an amplitude of the phase voltage command, the controller detects currents flowing in the maximum phase and the minimum phase through the power supply current detection sensor detecting the power supply current twice before and after a switching timing of the upper arm switching element corresponding to the middle phase, and uses the detected currents so as to calculate the phase voltage commands.

6. The inverter device according to claim 2,
wherein when a current supply period of the lower arm switching element corresponding to any one of the first phase and the second phase is shorter than a current detection period Tc, or a current supply period of the upper arm switching element corresponding to the third phase is shorter than the current detection period Tc,
the phase current detection sensor detects the current flowing in the first phase at a timing at which a period equal to or longer than the current detection period Tc is secured,
the power supply current detection sensor detects the power supply current at least once in a cycle of the first carrier triangle wave or the second carrier triangle wave, to thereby detect the current flowing in at least one phase out of the second phase and the third phase, and
the controller calculates the phase voltage commands based on the currents detected by the phase current detection sensor and the power supply current detection sensor.

7. The inverter device according to claim 6, wherein the controller is configured to detect currents flowing in at least two phases out of the three phases of the three-phase inverter by the power supply current detection sensor and the phase current detection sensor detecting the power supply current and the phase current, respectively, at a timing at which a period equal to or longer than the current detection period Tc is secured in the first phase, and use the detected currents so as to calculate the phase voltage commands.

8. The inverter device according to claim 2, wherein when the phase voltage command matches an output upper limit value or an output lower limit value of the three-phase inverter in the second phase and the third phase out of the three phases of the three-phase inverter, and a current supply period of the lower arm switching element corresponding to the first phase is equal to or longer than Tc, the controller uses the power supply current and the phase current detected by the power supply current detection sensor and the phase current detection sensor, respectively, at a maximum value time point, which is a time point at which the first carrier triangle wave reaches the maximum value, so as to calculate the voltage commands.

9. The inverter device according to claim 2, wherein when an amplitude of the phase voltage command exceeds an upper limit value set in advance, the controller sets the phase of the first carrier triangle wave and the phase of the second carrier triangle wave so as to be in phase with each other.

10. The inverter device according to claim 2, wherein the controller is configured to:

generate the on/off signals so that an effective vector that causes the power supply current and the phase current to have the same value is output from the three-phase inverter; and
determine, when a difference between the power supply current and the phase current detected at a time point at which the three-phase inverter outputs the effective vector exceeds an upper limit value set in advance, that at least one of the power supply current detection sensor or the phase current detection sensor has a failure.

11. The inverter device according to claim 1, wherein in a case where the three phases of the three-phase inverter are set to a maximum phase, a middle phase, and a minimum phase, respectively, in descending order of the amplitude of the phase voltage command,
when the phase voltage command in the maximum phase is higher than an output upper limit value of the three-phase inverter, the controller calculates a subtraction value obtained by subtracting the output upper limit value from the phase voltage command in the maximum phase, and sets values respectively obtained by subtracting the subtraction value from the phase voltage commands in the maximum phase, the middle phase, and the minimum phase as the phase voltage commands respectively in the maximum phase, the middle phase, and the minimum phase, and
when the minimum phase is lower than an output lower limit value of the three-phase inverter, the controller calculates a subtraction value obtained by subtracting the output lower limit value from the phase voltage command in the minimum phase, and sets values respectively obtained by subtracting the subtraction value from the maximum phase, the middle phase, and the minimum phase as phase voltage commands respectively in the maximum phase, the middle phase, and the minimum phase.

12. The inverter device according to claim 1, wherein when the controller detects a failure in the phase current detection sensor, the controller generates the on/off signals so that at least two types of effective vectors are output from the three-phase inverter, detect currents flowing in at least two phases out of currents flowing through output terminals of the three-phase inverter based on the power supply current detected by the power supply current detection sensor at a time point at which the three-phase inverter outputs the effective vectors, and calculates the phase voltage commands based on the currents flowing in the at least two phases.

13. The inverter device according to claim 1,
wherein the AC motor is provided with a rotation position detector configured to detect a rotor magnet pole position of the AC motor, and
wherein when the controller detects a failure of the power supply current detection sensor, the controller estimates currents flowing in at least two phases out of the three phases of the three-phase inverter based on the phase current detected by the phase current detection sensor and the rotor magnetic pole position detected by the rotation position detector, and calculates the phase voltage commands based on the estimated currents and the phase current detected by the phase current detection sensor.

14. The inverter device according to claim 1, wherein when the controller detects a failure in the power supply current detection sensor or the phase current detection sensor, the controller calculates the phase voltage commands based on a current command corresponding to a current flowing through the AC motor, and an electric constant of the AC motor.

15. The inverter device according to claim 1, wherein the phase current detection sensor is provided between the lower arm switching element in the one phase for which the phase current detection sensor is provided out of the three phases of the three-phase inverter and a negative terminal of the DC power supply.

16. The inverter device according to claim 1, wherein the power supply current detection sensor is arranged on a positive side of the DC power supply in the inverter device.

17. An electric power steering apparatus, comprising:
the inverter device of claim 1; and
the AC motor configured to generate an assist torque for assisting steering by a driver.

* * * * *